US011539748B2

(12) United States Patent
Digiambattista et al.

(10) Patent No.: US 11,539,748 B2
(45) Date of Patent: Dec. 27, 2022

(54) MONITORING AND REPORTING ENTERPRISE LEVEL CYBERSECURITY REMEDIATION

(71) Applicant: ZERONORTH, INC., Boston, MA (US)

(72) Inventors: Ernesto Digiambattista, Lynnfield, MA (US); Andrei Bezdedeanu, Westwood, MA (US); Michael D. Kail, Los Gatos, CA (US)

(73) Assignee: ZeroNorth, Inc., Boston, MA (US)

(*) Notice: Subject to any disclaimer, the term of this patent is extended or adjusted under 35 U.S.C. 154(b) by 810 days.

(21) Appl. No.: 16/253,991

(22) Filed: Jan. 22, 2019

(65) Prior Publication Data
US 2019/0230129 A1 Jul. 25, 2019

Related U.S. Application Data

(60) Provisional application No. 62/620,966, filed on Jan. 23, 2018.

(51) Int. Cl.
H04L 9/40 (2022.01)
G06Q 30/00 (2012.01)

(52) U.S. Cl.
CPC .......... H04L 63/20 (2013.01); G06Q 30/018 (2013.01); H04L 63/1433 (2013.01); H04L 63/1441 (2013.01)

(58) Field of Classification Search
CPC .. H04L 63/20; H04L 63/1433; H04L 63/1441
USPC .......................................................... 726/1
See application file for complete search history.

(56) References Cited

U.S. PATENT DOCUMENTS

| 8,244,777 | B1 | 8/2012 | Vijendra et al. |
| 8,769,412 | B2 | 7/2014 | Gill et al. |
| 8,832,828 | B2 | 9/2014 | Lyne et al. |
| 8,918,775 | B1 | 12/2014 | Carpenter et al. |
| 9,110,976 | B2 | 8/2015 | Bolgert et al. |
| 9,210,141 | B2 | 12/2015 | Anderson et al. |
| 9,391,995 | B2* | 7/2016 | Stuntebeck ........... H04L 63/102 |
| 9,483,281 | B2 | 11/2016 | Bonczkowski et al. |
| 9,734,169 | B2 | 8/2017 | Redlich et al. |

(Continued)

OTHER PUBLICATIONS

International Application No. PCT/US2018/042357, International Search Report and Written Opinion dated Sep. 27, 2018, 12 pages.

(Continued)

Primary Examiner — Teshome Hailu
(74) Attorney, Agent, or Firm — Han Santos, PLLC

(57) ABSTRACT

An orchestration system is described that is configured to receive a request to monitor compliance of an enterprise infrastructure and generate an infrastructure change that is associated with the compliance of the enterprise infrastructure, based at least in part on a set of predetermined criteria. In doing so, the orchestration system may further generate one or more infrastructure change events based at least in part on instances of the infrastructure change within the enterprise infrastructure. The orchestration system may further generate a verification report for the enterprise infrastructure, based at least in part on the one or more infrastructure change events, and transmit the verification report to a registered user associated with the request.

20 Claims, 12 Drawing Sheets

(56) References Cited

U.S. PATENT DOCUMENTS

| | | |
|---|---|---|
| 9,876,684 B2 | 1/2018 | Gomadam et al. |
| 10,021,138 B2 | 7/2018 | Gill et al. |
| 10,055,249 B2 | 8/2018 | Betzler et al. |
| 10,075,429 B2 | 9/2018 | Jayanti Venkata et al. |
| 10,104,127 B2 | 10/2018 | Schmidt et al. |
| 10,177,988 B2 | 1/2019 | Maes |
| 10,447,483 B1 | 10/2019 | Su |
| 10,579,361 B1 | 3/2020 | Gerraty |
| 10,885,159 B2 | 1/2021 | Smaiely |
| 2005/0262233 A1 | 11/2005 | Alon et al. |
| 2008/0172664 A1 | 7/2008 | Nduaguba et al. |
| 2008/0270727 A1 | 10/2008 | Jacobson et al. |
| 2010/0100535 A1 | 4/2010 | Melancon |
| 2010/0251365 A1* | 9/2010 | Lyne ............ G06F 21/55 726/22 |
| 2011/0126099 A1 | 5/2011 | Anderson et al. |
| 2011/0302640 A1 | 12/2011 | Liu et al. |
| 2013/0254755 A1 | 9/2013 | Yousouf et al. |
| 2013/0276055 A1* | 10/2013 | Jacobson ............ H04L 63/20 726/1 |
| 2014/0006685 A1 | 1/2014 | Peterson et al. |
| 2014/0226404 A1 | 8/2014 | Lee et al. |
| 2014/0237550 A1 | 8/2014 | Anderson et al. |
| 2015/0134677 A1 | 5/2015 | Abuelsaad et al. |
| 2015/0178066 A1 | 6/2015 | Horn et al. |
| 2015/0309769 A1 | 10/2015 | Greene et al. |
| 2015/0365437 A1 | 12/2015 | Bell, Jr. et al. |
| 2016/0085543 A1 | 3/2016 | Islam et al. |
| 2016/0087854 A1 | 3/2016 | Venkata et al. |
| 2016/0088021 A1* | 3/2016 | Jayanti Venkata .... H04W 28/08 726/1 |
| 2016/0232358 A1* | 8/2016 | Grieco ............ G06F 21/577 |
| 2016/0299933 A1 | 10/2016 | Fillipi et al. |
| 2016/0342989 A1 | 11/2016 | Davis |
| 2017/0017795 A1* | 1/2017 | DiGiambattista ......... G06F 8/61 |
| 2017/0124556 A1 | 5/2017 | Seger |
| 2017/0126712 A1 | 5/2017 | Crabtree et al. |
| 2017/0153914 A1 | 6/2017 | Rausch et al. |
| 2017/0178019 A1 | 6/2017 | Duggan et al. |
| 2017/0213221 A1 | 7/2017 | Kurian et al. |
| 2017/0214675 A1 | 7/2017 | Johnsrud et al. |
| 2017/0228371 A1 | 8/2017 | Seger |
| 2017/0230285 A1* | 8/2017 | Crabtree ............ G06Q 10/0637 |
| 2017/0353497 A1* | 12/2017 | Bradley ............ H04L 63/102 |
| 2017/0359306 A1 | 12/2017 | Thomas et al. |
| 2017/0372080 A1 | 12/2017 | Gordon et al. |
| 2018/0049043 A1 | 2/2018 | Hoffberg |
| 2018/0082296 A1 | 3/2018 | Brashers |
| 2018/0176229 A1 | 6/2018 | Bathen et al. |
| 2018/0183606 A1 | 6/2018 | High et al. |
| 2018/0217827 A1 | 8/2018 | Arcese et al. |
| 2018/0295154 A1 | 10/2018 | Crabtree et al. |
| 2018/0316502 A1 | 11/2018 | Nadeau et al. |
| 2019/0058592 A1 | 2/2019 | Wright et al. |
| 2019/0139168 A1 | 5/2019 | Agassi et al. |
| 2019/0179672 A1 | 6/2019 | Christidis et al. |
| 2019/0182254 A1 | 6/2019 | Christidis et al. |
| 2019/0207965 A1 | 7/2019 | Espinosa et al. |
| 2019/0221225 A1 | 7/2019 | Bricklin et al. |
| 2019/0236316 A1 | 8/2019 | Watkins et al. |
| 2019/0259274 A1 | 8/2019 | Avery et al. |
| 2019/0273610 A1 | 9/2019 | Fan et al. |
| 2019/0327193 A1 | 10/2019 | Kuncheria et al. |
| 2019/0354943 A1 | 11/2019 | Mulye et al. |
| 2019/0392050 A1 | 12/2019 | Weil et al. |
| 2019/0394023 A1 | 12/2019 | Menon et al. |
| 2020/0005404 A1 | 1/2020 | Patterson et al. |
| 2020/0044918 A1 | 2/2020 | Byers et al. |
| 2020/0065697 A1 | 2/2020 | Watson et al. |
| 2020/0073651 A1 | 3/2020 | Bravo et al. |
| 2020/0097882 A1 | 3/2020 | Alagappan |
| 2020/0111104 A1 | 4/2020 | George et al. |
| 2020/0119936 A1 | 4/2020 | Balasaygun et al. |
| 2020/0125656 A1 | 4/2020 | Li |
| 2020/0134163 A1 | 4/2020 | Courtney et al. |
| 2020/0134189 A1 | 4/2020 | Carter et al. |
| 2020/0142682 A1 | 5/2020 | Marks et al. |
| 2020/0167773 A1 | 5/2020 | Cervenka et al. |

OTHER PUBLICATIONS

International Application No. PCT/US2019/014837, International Search Report and Written Opinion, dated Apr. 24, 2019, 10 pages.
International Application No. PCT/US2019/014846, International Search Report and Written Opinion, dated Apr. 29, 2019, 17 pages.
Liang et al. "Provchain: A blockchain-based data provenance architecture in cloud environment 1-15 with enhanced privacy and availability." In: Proceedings of the 17th IEEE/ACM internationalsymposium on cluster, cloud and grid computing. May 2017 (May 2017) Retrieved on Mar. 30, 2019 (Mar. 30, 2019) from entire document.
U.S. Appl. No. 15/658,022, Non Final Office Action dated Oct. 2, 2018, 16 pages.
U.S. Appl. No. 16/169,951, Non-Final Office Action dated Feb. 27, 2020, 33 pages.
U.S. Appl. No. 16/253,944, Non-Final Office Action dated Jan. 11, 2021, 27 pages.
U.S. Appl. No. 16/253,944, Notice of Allowance dated Jun. 3, 2021, 25 pages.

* cited by examiner

MONITORING AND REPORTING ENTERPRISE LEVEL CYBERSECURITY REMEDIATION

CROSS-REFERENCE TO RELATED APPLICATION

This application claims priority to U.S. Provisional Patent Application No. 62/620,966, filed on Jan. 23, 2019, entitled "Monitoring & Reporting Enterprise Level Cybersecurity Remediation," which is hereby incorporated by reference in its entirety.

BACKGROUND

Present day enterprises have come to rely on mission critical computing systems. Such systems may include automation for accounting, finance, human resources, and other enterprise automation. Without automation, enterprises might not be able to service a large number of customers, would not be able to quickly determine who they owed money to or who owed them money, or be able to collaborate on work product. Indeed, if an enterprise's automation were to be compromised, that enterprise may run the risk of facing losses tantamount to going out of business. Accordingly, the ability for an enterprise to protect, backup, and recover from automation failures and threats is tantamount to ensuring not only the enterprise's health, but indeed its survival.

Accordingly, various vendors have made product offerings to safeguard enterprise systems and data. Examples include: Qualys™, Check Point Software™ and Fortinet™ However, different safeguarding software systems, may each have a different focus. One system may protect server-side computing instances but may not protect client-side software. Another system may provide proactive security scanning, but may not offer recovery assistance in the case of compromise. Worse, rather than working in concert, different systems may inadvertently act against each other.

Accordingly, enterprises have turned to installing a number of safeguarding software systems to automate the protection, backup, recovery of their mission critical computing systems. However, presently, there is no technology to orchestrate the response of these diverse safeguarding software systems in a unified and coherent fashion. Furthermore, as a consequence of there being no present orchestration technology, there is no present way for enterprises to perform orchestrated self-healing and response in the event of a security breach.

BRIEF DESCRIPTION OF THE DRAWINGS

The Detailed Description is set forth with reference to the accompanying figures.

DETAILED DESCRIPTION

Figure 1:
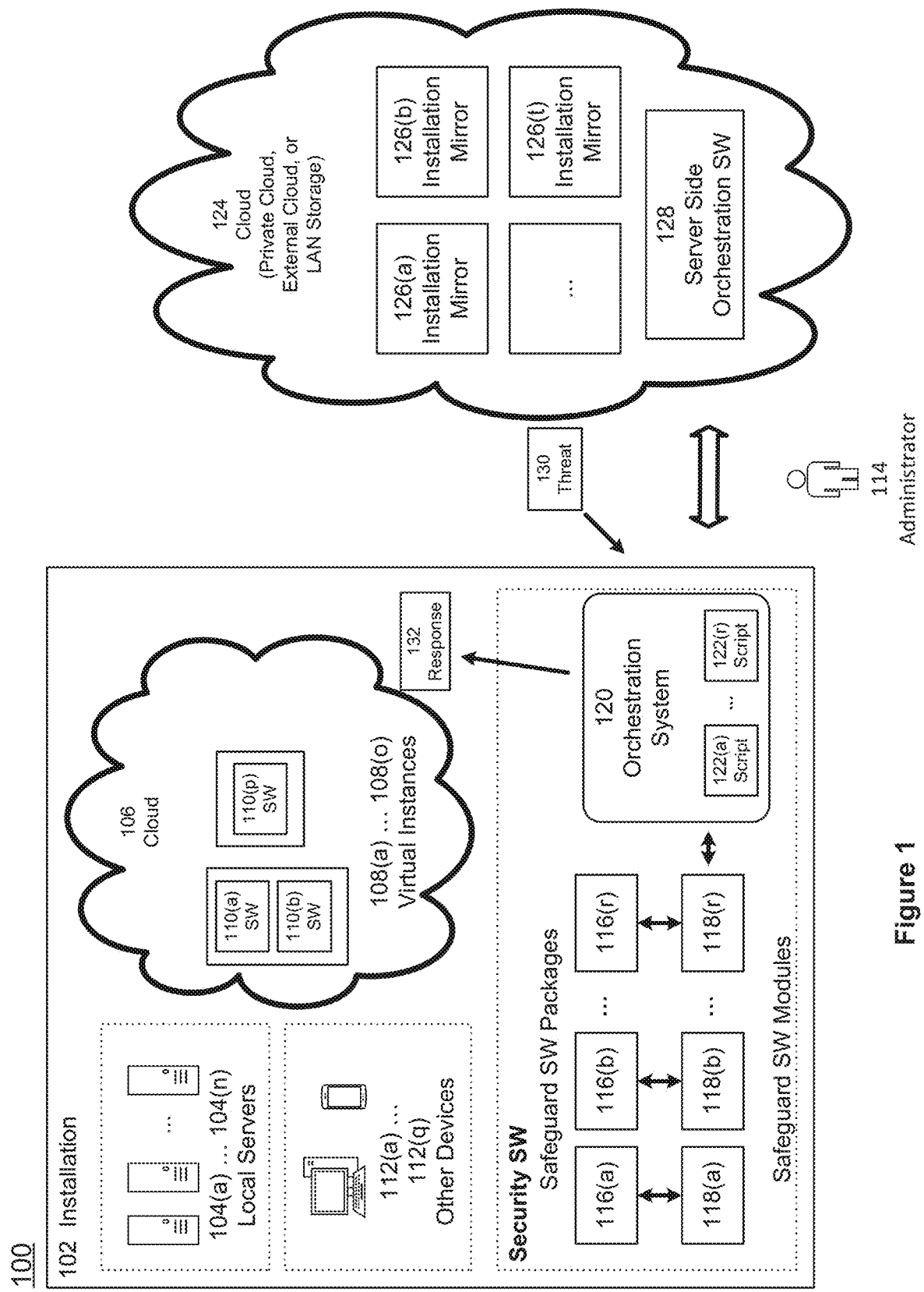
FIG. 1 is a top-level context diagram of enterprise level security orchestration.

Presently there is an unmet need to perform enterprise level security orchestration. Herein is described a system and methods to provide such enterprise level security orchestration. As described above, there presently exist a number of commercial enterprise safeguarding systems for enterprises. These systems can perform threat scanning, mirroring, recovery, and other functions. However, typical large enterprises will deploy several of these safeguarding systems, and presently those safeguarding systems are not orchestrated to act in concert. There exist a large number of scenarios, such passive and active scanning, end to end threat penetration testing, and application recovery, where the several deployed safeguarding systems would be used in concert. In the scanning instance, an enterprise may desire to first run a scan using Qualys™ and the afterwards run a scan using BeyondTrust™ to ensure that the latter caught what the former might have missed.

The orchestration function may be met by providing an orchestration system where different safeguard software packages, such as Qualys™, Check Point™, and Fortinet™ have corresponding safeguard software modules to interface a respective safeguard software package with the orchestration system. In this way, the orchestration system could run orchestration routines that utilized some or all of the safeguard software packages to perform security testing or other security functions on the enterprise.

Addressing the above would provide the orchestration portion of enterprise level security orchestration. However, to make the security orchestration function enterprise level, the present system ideally would have the ability to perform security testing and other security functions isolated from production systems. Accordingly, the orchestration system would have access to a mirror of the entire enterprise, in effect creating an enterprise size sandbox. Because the amount of data for the enterprise, there are technical challenges addressed herein to enable timely, enterprise scope sandboxing.

Accordingly, preparing an orchestration system, interfaced with various safeguard software packages via corresponding safeguard software modules, with access to storage sufficient for enterprise scale mirroring, and mirroring functions with sufficient performance to perform mirroring in a timely fashion, would provide enterprise level security orchestration.

Enterprise level security orchestration enables security testing and safeguarding functions that are functions that support a security scenario. Scenarios include, without limitation:

Vulnerability scanning,
Active scanning,
Penetration test scanning,
Web application scanning,
End to end scanning,
Software development scanning,
Pre-release scanning,
White hat/Tiger team methodology scanning
Remediation management, and
Reporting management.

The above scenarios need not be performed in a vacuum. Many of the above scenarios are performed in concert with other enterprise operations. By way of example, consider developer operations which comprise a development life cycle and a test life cycle. Specifically, when enterprise critical applications are developed, they are typically developed according to a software development methodology, which compartmentalizes different phases of development. In doing so, the methodology offers checkpoints where work product, such as documentation and working code, may be tested. By detected potential problems early in development, those problems if properly corrected will not propagate through the system.

One example of a software development methodology is called the "waterfall model." In the waterfall model, software is roughly subdivided into the following phases. The first phase is "strategy" where the goals of the project are identified and sponsorship/funding is secured. The second phase is "requirements" where what the software is to do, is specified in a formal requirements document. The third phase is "design" where how the software is to be implemented is specified in a formal design document. For example, the requirements document may specify that four fields are to be used to specify an employee. The design document may show an input form for the employee and specify the use of Visual C# and a .NET runtime for implementation. The fourth phase is implementation, where the design is coded. The fifth phase is testing, where the coded project is put into acceptance testing, and bugs are fixed. Upon passing acceptance, the sixth phase is deployment, where the software is rolled out to production.

In the waterfall model, enterprise level security orchestration may be applied during the test phase as part of acceptance testing. While it is not expected that information technology developers will introduce malware, their preliminary code might introduce security flaws, such as open ports or unintentionally unsecured modules. Those, and other security problems may accordingly be detected via enterprise level security orchestration.

Presently, more contemporary software development methodologies have become more iterative. Specifically, because it was possible to hold up development until the completion of a comprehensive functional requirements document, software development methodologies, such as "Agile", arose in response where development was subdivided across multiple development efforts of smaller and more discrete software features. Developing on such feature could be done in a short period of time called a "sprint". Accordingly, development of a single software product might comprise multiple sprints.

Enterprise level security orchestration lends itself very well to contemporary software development methodologies. Enterprise level security orchestration may be applied to the software product under development after each sprint. Because of the scalable nature of enterprise level security orchestration, multiple mirrors of an installation may be tested for security, synchronously. Synchronous testing is described in greater detail with respect to FIG. 5. Thus, enterprise level security orchestration may be integrated with development operations, including contemporary Agile software development methodologies, as well as other enterprise operation methodologies.

Exemplary Context Diagram of Enterprise Level Security Orchestration

FIG. 1 provides an exemplary context diagram 100 for enterprise level security orchestration. Enterprises have an information technology installation 102 comprising all computing, networking, and storage devices used by the enterprise and their software. An installation may include several local servers 104(a) through 104(n), sited on the enterprise's premises. An installation may also include cloud infrastructure 106 provided by one or more cloud providers on one or more cloud virtual instances 108(a) through 108(o). On those local servers 104 and/or the cloud virtual instances 108, the enterprise may install enterprise software systems 110(a) through 110(p) that automate enterprise operations across the enterprise, such as accounting, finance, customer relations management.

An installation 102 is not limited to server-side. An installation may include other devices 112(a) through 112(q) that may include client personal computers, tablets, cell phone, and other mobile devices, along with their respective client software.

An installation 102 is generally overseen by an administrator 114, whose responsibilities include the security of the installation 102. Accordingly, the administrator 114 will typically deploy a number of commercially available safeguard software packages 116(a) through 116(r). As described above, exemplary safeguard software packages 116 may include, but are not limited to, Qualys™, Check Point Software™ and Fortinet™. In general, a safeguard software package 116 is any software package deployed by the administrator to perform a safeguarding or security function that is to work with the other safeguard software packages 116.

Each safeguard software package 116, has a corresponding safeguard software module 118(a) through 118(r). Because different safeguard software packages 116 have different means of automation and different functions, and because the safeguard software packages 116 are likely to have changing versions over time, the safeguard software module 118 provides a layer of software to provide a consistent interface to abstract away the changing nature of the underlying safeguard software packages 116.

The safeguard software modules 118 interface to an installation side orchestration system 120. The orchestration system provides the administrator 114 with a user interface, including a dashboard to receive notifications and alerts from the safeguard software packages 116 in an integrated fashion.

From time to time, the administrator may choose to automate the safeguard software packages 116, generally in concert with each other. This is accomplished via, orchestration routines specified by scripts 122(a) through 122(r). An orchestration routine is a script which can make calls to the safeguard software packages 116, via the automation interfaces provided by the safeguard software modules 118. Specifically, after an administrator programs and deploys a script 122 to run at specified times and/or specified intervals, the orchestration system 120 will run the script 122 at the appointed time via a runtime that is part of the orchestration system. When the script invokes a call to a safeguard software package 116, the runtime will call the respective safeguard software module 118, which in turn performs the automation call specific to the safeguard software package 116. For example, if the safeguard software package 116 proffers a Component Object Module or .NET™ interface, the safeguard software module 118 will be configured to invoke such interfaces. If the safeguard software package 116 does not have native automation, automation may be performed through alternatives, such as journaling hooks.

Because the orchestration system 120 executes the scripts 122, it also receives all the results of the safeguarding and security operations such as passive and active scans. Accordingly, the orchestration system can include an analytics function which stores the results, performs analysis, and detects patterns of threats. In this way, the administrator 114 may change the configuration of the safeguard packages to close off threats. In some cases, the orchestration system 120 may automatically respond to close off threats. Such automation may also be performed by programmed scripts 122.

Scripts 122 may implement different security methodologies. Accordingly, an advantage of the centralized orchestration system 120, is the ability of the administrator 114 to implement multiple methodologies across multiple safeguard software packages 116.

As described above, it may be desirable to perform security and safeguard functions isolated from production systems. An example scenario includes testing software or data, prior to incorporation into production. In such a scenario, it is desirable to replicate all, or part of an installation 102. Because of the cloud, storage costs have dropped sufficiently to make large scale replication feasible. Alternatively, a well-funded enterprise could opt to implement a private cloud and have the replication storage local on premises. Finally, commercial software, such as Actifio™ provides the means to perform timely replication of an entire or a portion of an installation 102.

Accordingly, cloud 124 may be external or alternatively on premises. Cloud 124, provides storage and infrastructure to host full or partial mirrors 126(*a*) through (*t*) of installation 102. The server-side orchestration software 128 is communicatively controlled by the orchestration system 120. It provides coordination of the creation/destruction of mirrors 126, of the installation 102. The server-side orchestration software 128 also provides for performing security testing and safeguarding functions on the mirrors 126.

One way to make use of a mirror 126 is to perform testing on the mirror sequentially and asynchronously. For example, an administrator 114 may perform a scan using Qualsys™ first, and thereafter may scan using BeyondTrust™.

However, an advantage of the present system is that multiple mirrors 126 of the same enterprise installation 102 may be made. Accordingly, in the above scenario, two mirrors 126 could be made, and Qualsys™ run on the first and BeyondTrust™ run on the second. In this way, scanning is performed synchronously and the time to perform the scans could be substantially reduced to the time of a single scan. Synchronous scanning is described in further detail with respect to FIG. 5.

Beyond time savings, an administrator 114 may make mirrors 126 corresponding not only to safeguard software packages 116, but also to methodologies. Thus, if the administrator 114 wished to run five different methodologies, using multiple safeguard software packages 116, that could be achieved by creating a mirror 126 for each methodology. Thus, an administrator is more likely to detect threats and breaches. Mirrors 126 may be destroyed at will. Accordingly, any security threat detected is destroyed, and data replicas will not persist thereby creating the security risk that the data replicas are breached. As previously mentioned, mirrors 126 are isolated from production. When scans are performed on production, often production performance suffers due to the computing resource load of the scan. However, since mirrors 126 are isolated from production, a scan on a mirror 126 will not affect production performance. Accordingly, it is feasible to run continuous scans without adversely impacting the enterprise.

The orchestration system 120 and by extension the server-side orchestration software 128, include an analytics collector, a remediation engine, and a security reporting module. Thus, the orchestration system 120 has the ability to detect a threat 130, and correspondingly to make a response 132. The internals of the orchestration system 120 and the server-side orchestration software 128 are described in further detail with respect to FIG. 4. The orchestration system 120 also has automatic remediation capabilities including the ability to generate remediation measures and rollback information and to automatically deploy updates and remediation measures. Automatic remediation is described in further detail with respect to FIGS. 6 and 7. Automatic deployment options are described in further detail with respect to FIGS. 8 and 9.

Exemplary Hardware, Software and Communications Environment

Figure 2:
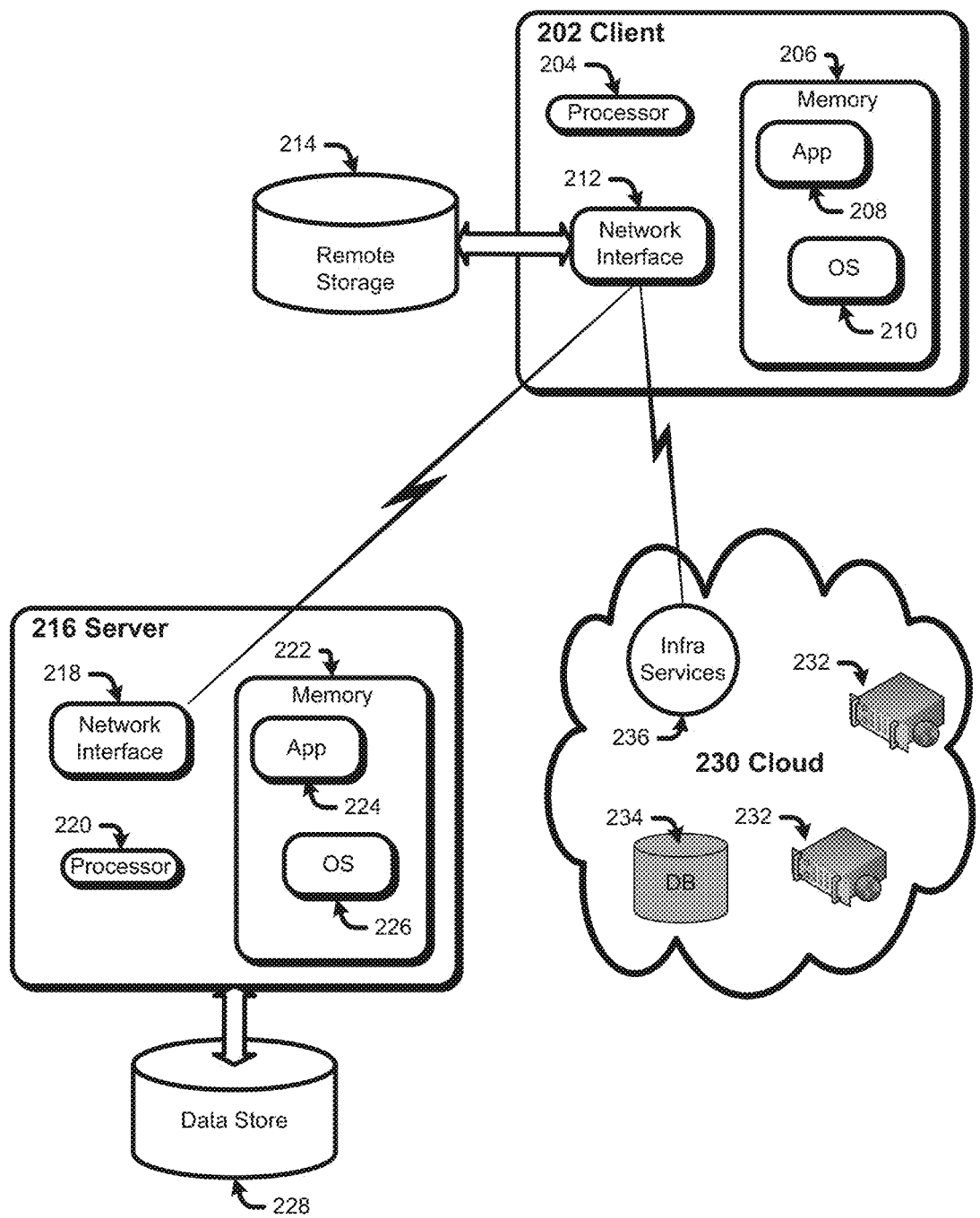
FIG. 2 is an environment diagram illustrative of hardware, software and communications infrastructure for enterprise level security orchestration.

Prior to disclosing enterprise level security orchestration and related techniques, exemplary hardware, software and communications environment is disclosed. FIG. 2 illustrates several possible embodiments of a hardware, software and communications environment 200 for enterprise level security orchestration and related techniques. Client device 202 is any computing device. Exemplary computing devices include without limitation personal computers, tablet computers, smart phones, and smart televisions and/or media players.

Enterprise level security orchestration and related techniques may be used in a number of platform contexts. Although enterprise level security orchestration and related techniques may be brought to bear on a typical networked client device 202 accessing a remote server, enterprise level security orchestration and related techniques alternatively may be implemented on a networked computer. Accordingly, those techniques might be performed on a client device 202 that is a personal computer or alternatively a portable laptop.

A client device 202 may have a processor 204 and a memory 206. Client device 202's memory 206 is any computer-readable media which may store several software components including an application 208 and/or an operating system 210. In general, a software component is a set of computer executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD), Blu-Ray or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

To participate in a communications environment, client device 202 may have a network interface 212. The network interface 212 may be one or more network interfaces including Ethernet, Wi-Fi, or any number of other physical and data link standard interfaces. In the case where the user need only do operations on a standalone single machine, the network interface 212 is optional.

Client device 202 may communicate to a server 216. Server 216 is any computing device that may participate in a network. The network may be, without limitation, a local area network ("LAN"), a virtual private network ("VPN"), a cellular network, or the Internet. The client network interface 212 may ultimately connect remote networked storage 214, or to server 216 via server network interface 218. Server network interface 218 may be one or more network interfaces as described with respect to client network interface 212.

Server 216 also has a processor 220 and memory 222. As per the preceding discussion regarding client device 202, memory 222 is any computer-readable media including both computer storage media and communication media.

In particular, memory 222 stores software which may include an application 224 and/or an operating system 226. Memory 222 may also store applications 224 that may include without limitation, an application server and a database management system. In this way, client device 202 may be configured with an application server and data management system to support a multi-tier configuration. Server 216 may include a data store 228 accessed by the data management system. The data store 228 may be configured as a relational database, an object-oriented database, a NoSQL database, and/or a columnar database, or any configuration to support scalable persistence.

The server 216 need not be on site or operated by the client enterprise. The server 216 may be hosted on the Internet on a cloud installation 230. The cloud installation 230 may represent a plurality of disaggregated servers which provide cloud services 232 in the form of virtual web application server functionality and virtual database functionality. Cloud services 232 and 234 of the cloud installation 230 may be made accessible via cloud infrastructure 236. Cloud infrastructure 236 not only provides access to cloud services 232, 234 but also billing services. Cloud infrastructure 236 may provide additional service abstractions such as Platform as a Service ("PAAS"), Infrastructure as a Service ("IAAS"), and Software as a Service ("SAAS"). The cloud services 232 and 234, as well as the cloud infrastructure 236, may also support implementation of other services, such as the decentralized secure ledger service 134.

Orchestration Software

Figure 3:
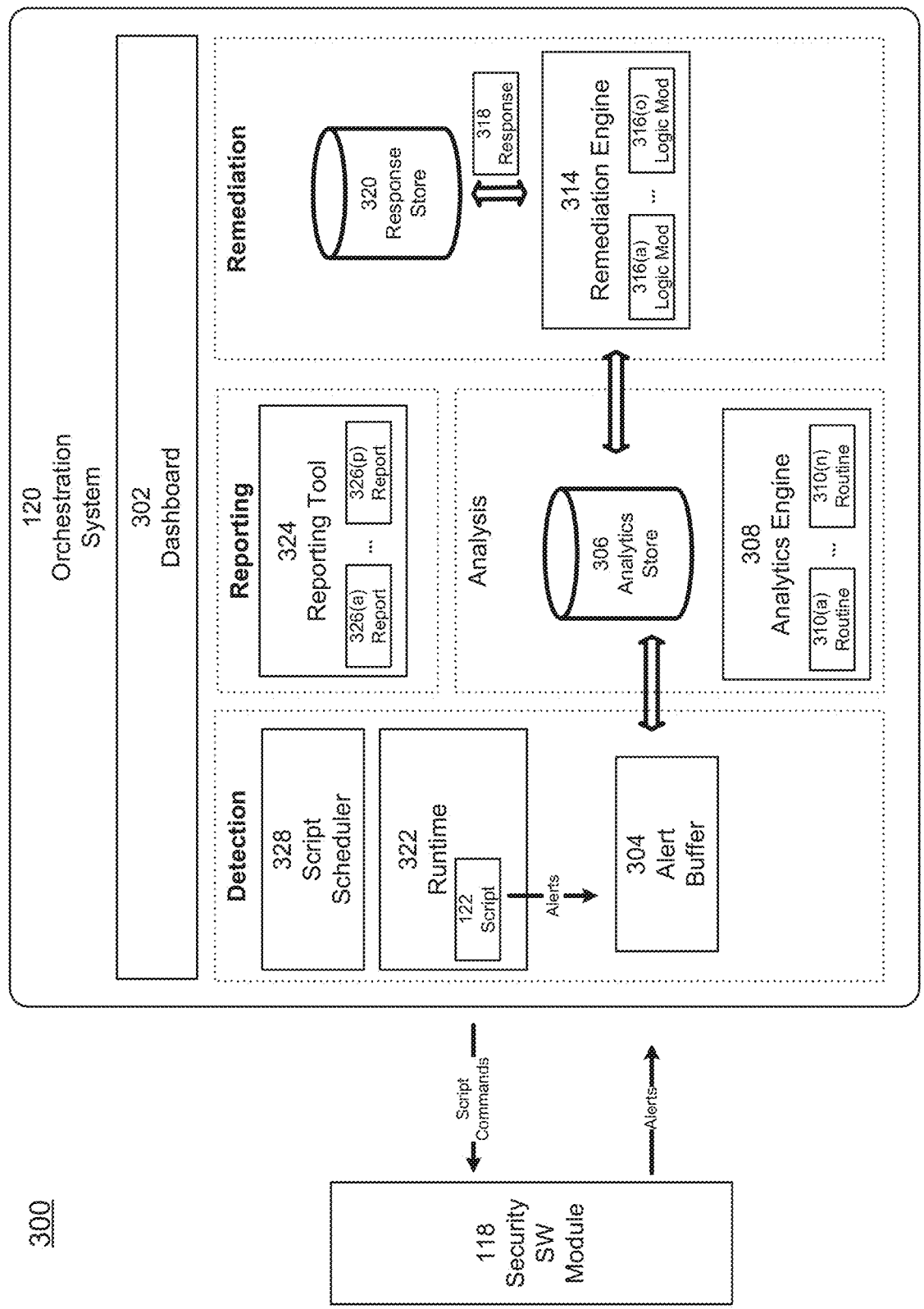
FIG. 3 is a block diagram for enterprise level security orchestration.

FIG. 3 is a block diagram 300 of the orchestration system 120 and the server-side orchestration software 128. The orchestration system 120 includes a dashboard 302 that provides an integrated view of the security status of the installation 102. It may show scans in progress, status of scans present and historical, reports and recommendations, and it may show present alerts. Accordingly, there are at least three types of notifications: (1) alerts from individual software packages 116, (2) alerts from scans in progress as orchestrated via scripts 122, and (3) surfaced recommendations not specific to a scan.

To receive alerts from individual safeguard software packages 116, a safeguard software package 116 will send an alert which is intercepted by a safeguard software module 118. The safeguard software module 118 then adds metadata identifying the safeguard software package 116, and itself, the safeguard software module 118, and then forwards the alert and metadata directly to alert buffer 304. The dashboard 302, will then receive a notification that a new alert has been received in alert buffer 304 and will update the dashboard user interface accordingly.

To receive alerts from scripts 122, a runtime 322 will execute a script 122. The script will then receive alerts from safeguard software packages 116 as forwarded by the safeguard software modules 118. Alternatively, the script may create an alert of its own. The run time will then add metadata identifying the script 122, the mirror instance 126, the safeguard software package 116 and the safeguard software module 118 that provided the alert. Both types of alerts are then forwarded by the runtime to the alert buffer 304. The dashboard 302 updates again by receiving a notification from the alert buffer 304 as described above.

From time to time, the alert buffer 304 will populate an analytics store 306. An analytics engine 308 will then run analytics routines 310(a) through 310(n) from time to time to identify threats. When a threat 312 is detected, the analytics engine 308 will create a record and populate the analytics store 306.

A remediation engine 314 monitors the analytics store 306 and detects threat patterns. The detection may be through any number of remediation logic modules 316(a) through 316(o). A remediation logic module 316 may be a hardcoded script from an administrator 114. For example, the remediation logic module 316 may simply state that where unauthorized access is via an open port, the remediation logic module 316 is to close the port and surface a report. A remediation logic module 316 may employ a similarity measure and based on past behavior the administrator closed an open port upon detection of an unauthorized access, and the remediation logic module 316 then closes all unused open ports proactively. A powerful remediation logic module 316 would be a module that implements any number of known machine learning algorithms to learn threats and to suggest responses 318. Responses 318 that are repeatedly accepted or used by the administrator are stored in response data store 320.

A reporting tool 324 creates reports 326(a) through 326(o) based on the records of the analytics store 306 and surfaces the availability of those reports on dashboard 302. In some cases, the reporting tool 324 make be invoked by the remediation engine 314 to surface recommended responses as recommendations.

Both threat data, as stored in the analytics store 306 and potential responses as stored in the response data store 320 need not be populated solely from scans of the installation. Third party data from the security community can also be loaded via the dashboard 302, thereby adding to the capabilities of the orchestration system 120. In general, the orchestration system 120 may aggregate data. A scheduler 328 is used to schedule the running of tests. Tests may be performed synchronously or asynchronously, in which the test results are stored by the scheduler 328 in the analytics store 306. Synchronous scheduling of tests is described in further detail with respect to FIG. 5. Thus, the orchestration system 120 aggregates and stores vulnerability and remediation data from various data sources for individual enterprise installations of multiple enterprises. Accordingly, the orchestration system 120 functions as a single authoritative source of vulnerability and remediation data for each enterprise installation of individual enterprises that are served by the orchestration system 120. For example, the orchestration system 120 may service as a single authoritative source of vulnerability and remediation data for the enterprise installation 102 shown in FIG. 1.

Life Cycle of Enterprise Level Security Orchestration

Figure 4:
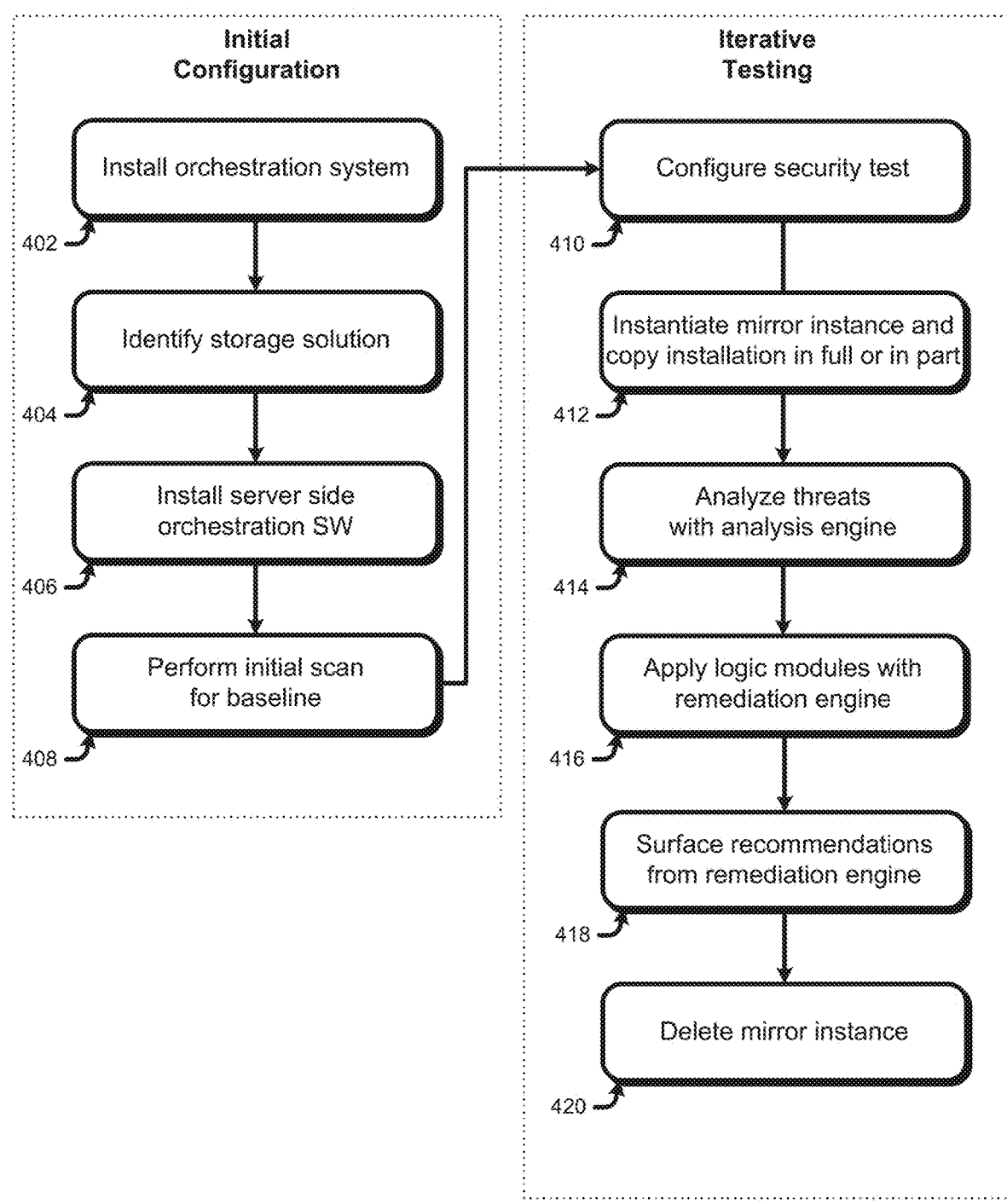
FIG. 4 is an illustration of the life cycle performing enterprise level security orchestration.

FIG. 4 is an illustration 400 of the life cycle of enterprise level security orchestration starting with an initial deployment. After the deployment, illustration 400 shows an exemplary continuing operation for enterprise level security orchestration.

In block 402, the orchestration system 120 is installed. This includes installing the safeguard software modules 118. Specifically, for every safeguard software package 116 installed, a corresponding safeguard software module 118 is installed and configured to interface the safeguard software package 116 to the orchestration software.

In block 404, a storage solution is identified. Generally an external cloud storage solution is identified. However, alternatively a private cloud could also be implemented. In yet other embodiments, standard networked storage on a local area network may be chosen as well. Thus storage could be either external, or on premises.

In block 406, the server-side orchestration software 128 is installed. Where external cloud has been chosen in block 404, the server-side orchestration software 128 will be configured to create mirrors 126 of the installation 102 on demand. Where local storage has been chosen, the server-side orchestration software 128 will be configured to allow the safeguard software packages 116 to operate directly on mirrored data.

In block 408, an initial scan may be performed. The installation's configuration along with the initial scan thereby provide a data baseline for the security state of the installation 102. At this point, the orchestration system 120 is ready for operations.

In block 410, the orchestration system 120 will be configured by an administrator 114 to run a particular security test, to perform continuous scanning, or to execute a script 122. The orchestration system 120 will then perform the request as scheduled. Generally, the request will be performed on a mirror 126.

On demand, by the orchestration system 120, in block 412, an installation 102 is mirrored in full or in part. The mirror 126 generally will include at least one application, as it would be installed in production, and a snapshot of the application's data. In the case of external cloud, copies of the safeguard software packages 116 and their respective safeguard software modules 118 will also be installed. Note that because the safeguard software packages 116 is also mirrored in block 412, versioning of the safeguard software packages 116 need not be tracked. The administrator 114 need only ensure that the safeguard software modules 118 match the safeguard software packages 116, and the safeguard software modules 118 are properly configured prior to mirroring.

Generally replicating installations 102 is a time-consuming process. However, commercial software, such as Actifio™ may be used to create mirrors in a timely fashion. Orchestration of replication is to be performed by the server-side orchestration software 128.

During the performance of the security tests, in block 410, threats and alerts are detected by the security software packages 116, by scripts 122 and are stored in the alert buffer 304, and where alerts that are threats 312 are stored in an analytics store 306.

In block 414, an analytics engine 308 analyzes the threats 312 in the analytics store 306 to detect threat patterns. Upon detection of threat patterns, in block 416, a remediation engine 314 is engaged. The remediation engine 314 employs a number of remediation logic modules 316 to identify potential responses 318. In block 418, responses 318 are surfaced as recommendations to the dashboard 302. In some cases responses 318 are automatically executed.

Note that reporting can be done in conjunction with past scans. For example, a second scan could be compared to the initial scan performed in block 408. Instead of surfacing all issues, only new issues could be surfaced by removing all issues identified in the initial scan. In this way, a "delta report" could be generated.

In block 420, the mirror instance 126 may then be deleted. In this way the mirror instance 126 would not pose a security risk where data could be exposed. At this point, operation can return back to block 412 to perform another scheduled test.

Synchronous Scanning

The discussion with respect to FIG. 4 is described sequentially and asynchronously. However, as mentioned above, testing may be performed synchronously. The insight is that multiple mirrors 126 may be instantiated in storage, and therefore different tests may be performed in parallel. In particular, because different safeguard software packages 116 operate on an entire mirror, running two or more packages in parallel on the same mirror at the same time would likely create race conditions. By running the two safeguard software packages 116 each on their own respective mirror 126, race conditions are avoided.

Figure 5:
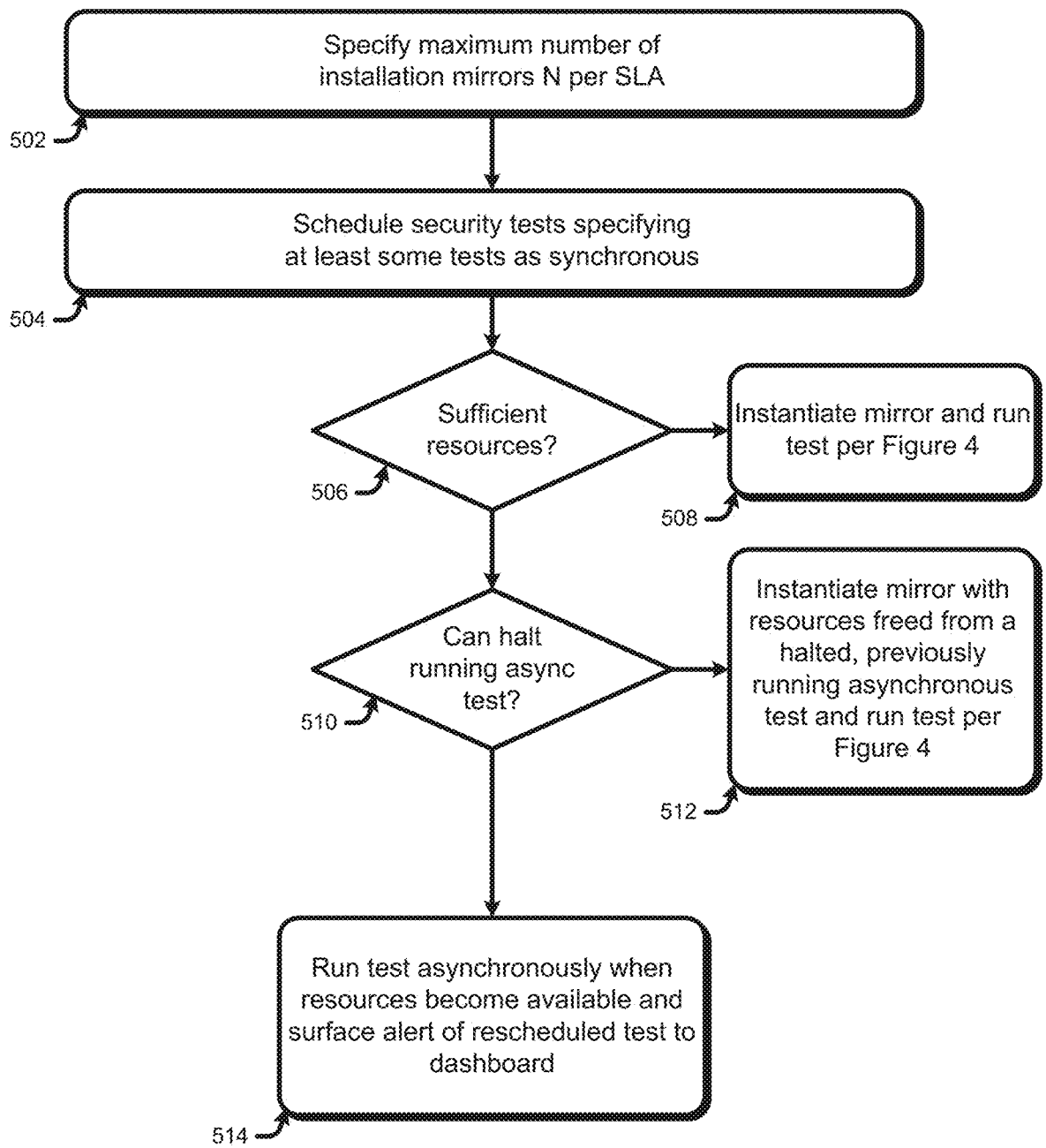
FIG. 5 is a flow chart for synchronous mirroring for enterprise level security orchestration.

To perform synchronous scanning, tests are to be scheduled synchronously. The scheduling functionality is largely performed by the scheduler 328 in the orchestration system 120. FIG. 5 is a flow chart 500 describing synchronous scanning.

In block 502, an administrator 114 specifies the maximum number of mirrors N that are covered by a service level agreement (SLA) with the cloud provider of cloud 124. While theoretically, the cloud 124 could run an unlimited number of mirrors, the administrator 114 will have a limit N based on cost.

In block 504, the administrator 114 schedules security tests. Tests may be marked as synchronous. Alternatively, multiple tests could be scheduled to run at the same time, in which case the scheduler 328 assumes that the tests are to be run synchronously.

In block 506, if a test is scheduled at the present time, the scheduler 328 checks to see if there is sufficient capacity to create a mirror. If there is, in block 508, the mirror is instantiated, and the test is run as per FIG. 4. If there is insufficient capacity, the scheduler 328 checks to see if there is a currently running asynchronous test 510. If there is, then in block 512, the currently running asynchronous test is halted, a new mirror is instantiated using the newly freed resources, and the test is run as per FIG. 4. If no currently running asynchronous test can be identified, then in block 514 the scheduler 328 schedules test run asynchronously and an alert is surfaced to the dashboard. The scheduler can be set with options where a test that cannot be run synchronously is simply not run.

Billing Options

The present system and methods are also to support various billing models. Some options are described as follows. One model would be to charge per safeguard software package 116 configuration or per test. In this model, different safeguard software modules 118, corresponding to a safeguard software package 116 could be marked with an identifier such as a globally unique identifier (GUID). Whenever the package was detected as running, the dashboard 302 could track whether the package was used, for what purpose, and the frequency of use.

Another model would be to charge per mirrored instance. Because the server-side orchestration software 128 is responsible for mirroring, it could track the number of mirrors created and whether a test completed successfully. Individual mirrors could be tracked timestamp or alternatively via an identifier such as a GUID. In this way, the volume of computing resources could be tracked.

Automatic Remediation

Figure 6:
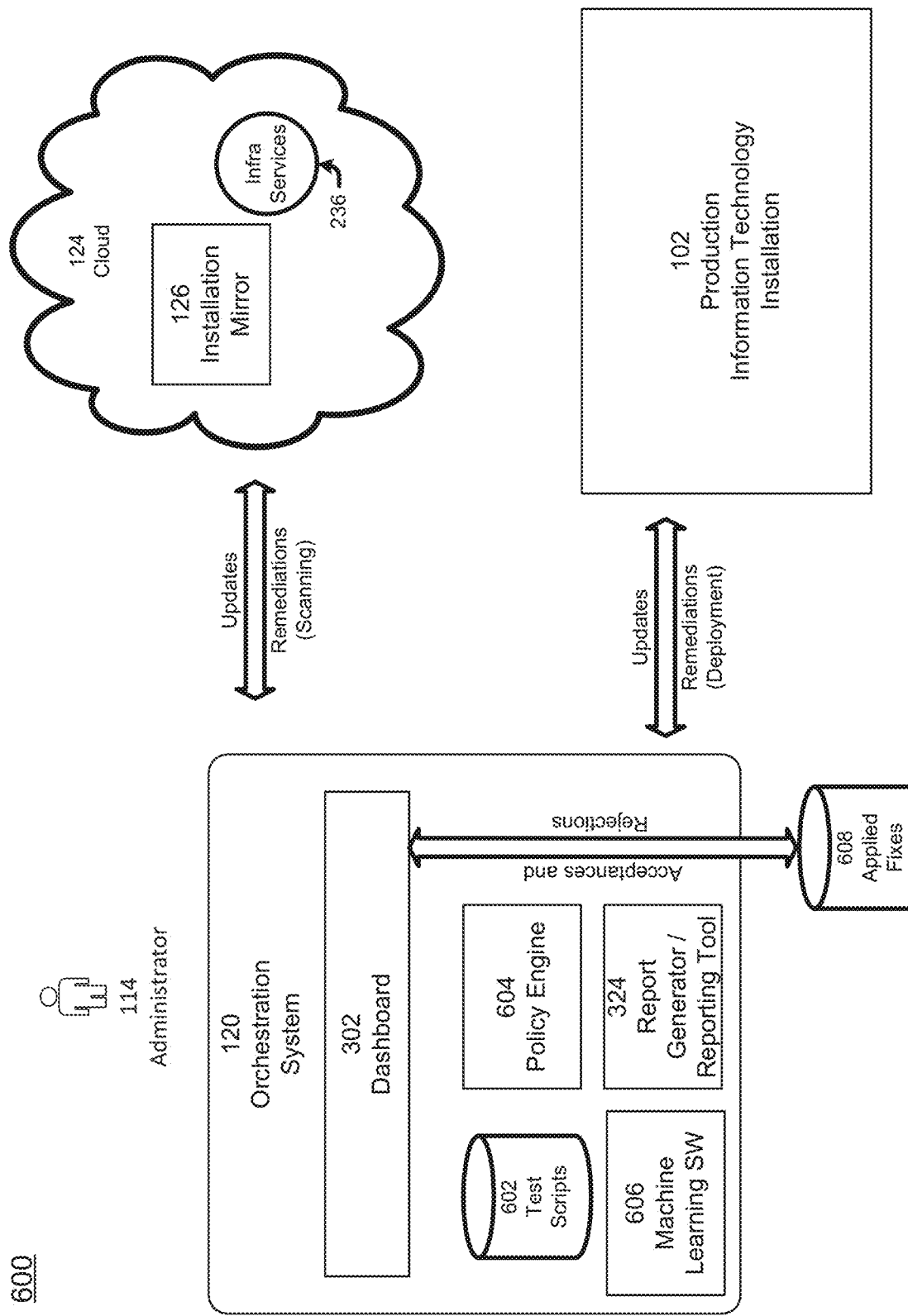
FIG. 6 is a block diagram for enterprise level cybersecurity automatic remediation.
Figure 7:
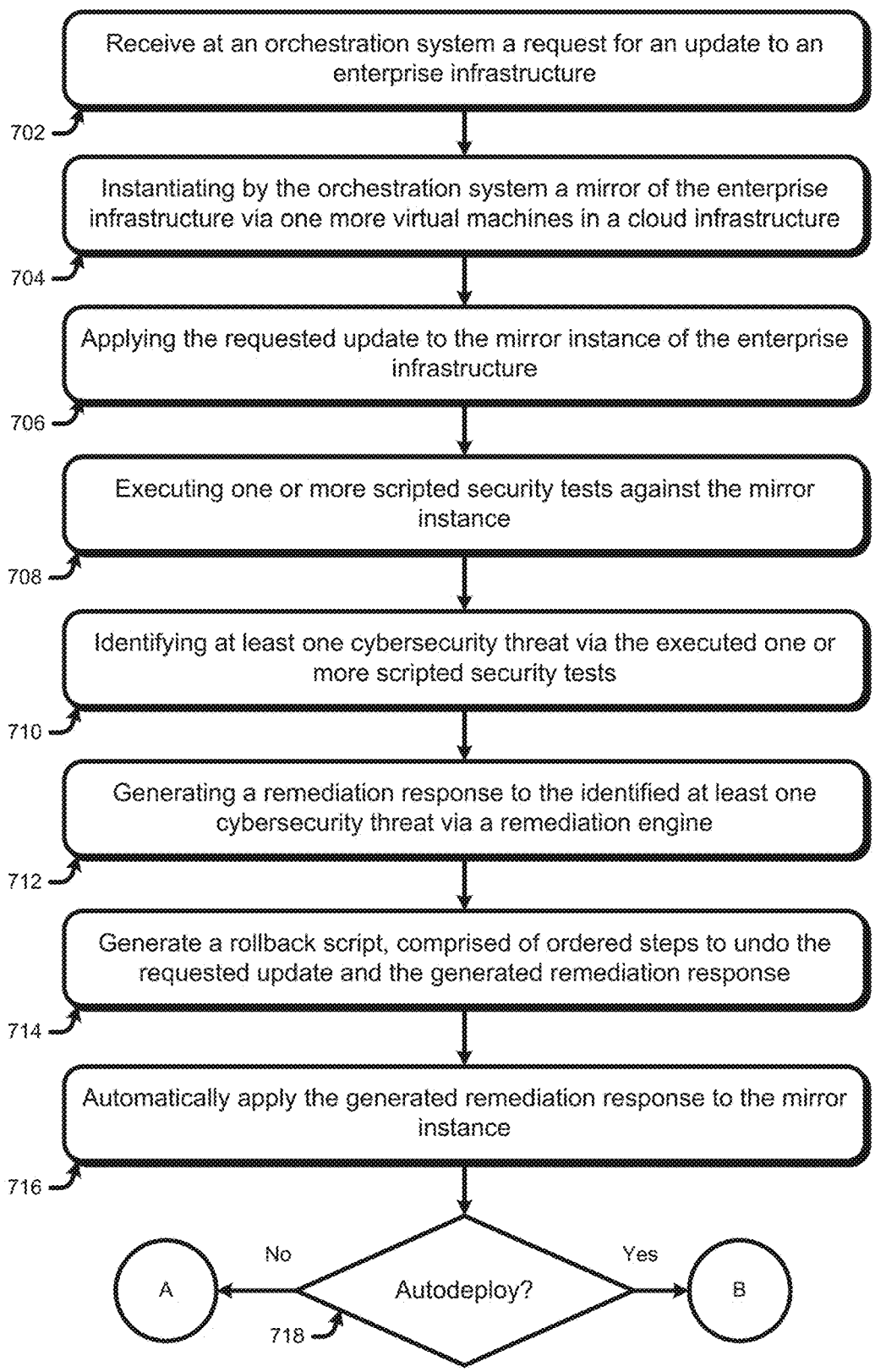
FIG. 7 is a flow chart for enterprise level cybersecurity automatic remediation.
Figure 8:
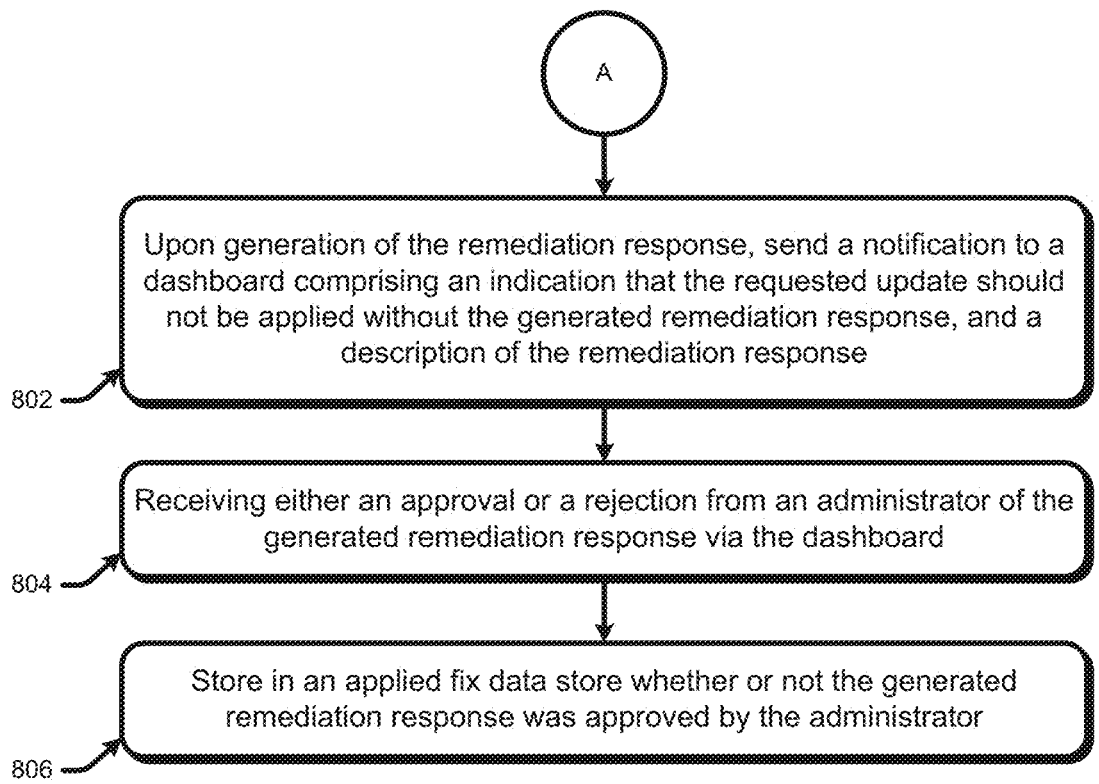
FIG. 8 is a flow chart for administrator authorized deployment of updates and remediation measures to production.
Figure 9:
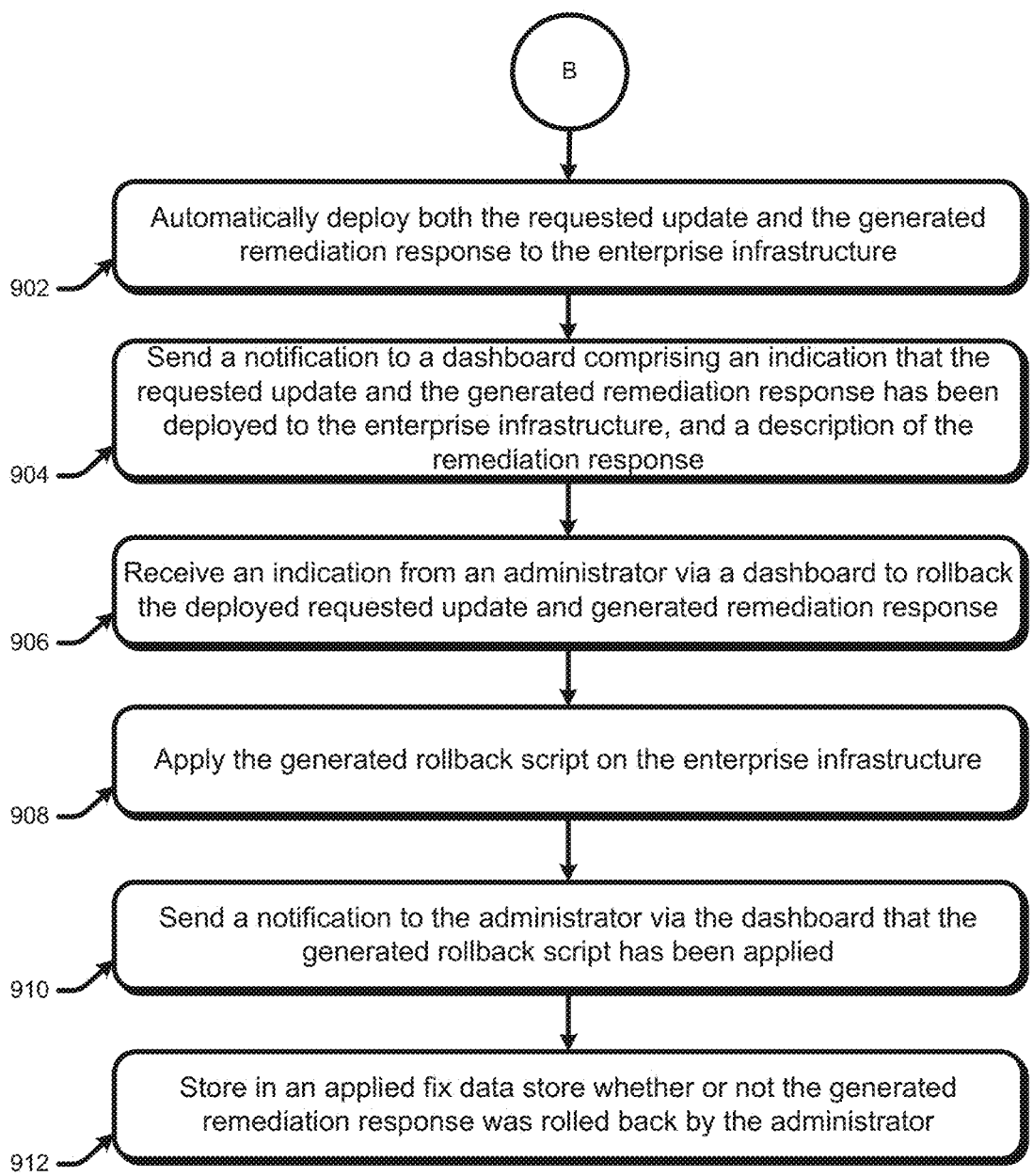
FIG. 9 is a flow chart for automatic deployment of updates and remediation measures to production, with rollback.

In one embodiment, the orchestration system 120 has automatic remediation capabilities. Specifically, the as updates are received, the orchestration system 120 may apply the update to an installation mirror 126, perform scans specified by the scripts 122 on the installation mirror 126 and detect cybersecurity threats. Where threats are detected, a remediation response may be generated and applied at the discretion of administrator 114 or alternatively may be automatically deployed. FIG. 6 is a block diagram 600 for automatic remediation. FIG. 7 is a flow chart 700 for automatic remediation. FIG. 8 is a flow chart 800 for administrator authorized deployment of updates and remediation measures to production. FIG. 9 is a flow chart 900 for automatic deployment of updates and remediation measures to product with rollback options. In general, FIG. 6's block diagram 600 illustrates additional components to the basic architecture set forth in FIG. 3 to support automatic remediation and is provided to for architectural context for flow charts 700, 800, and 900.

Turning to FIG. 7, in block 702, the orchestration system 120 receives a request to apply an update to an enterprise information technology installation 102. The updates may encapsulate additional functionality or bug fixes. Updates may come in the form of a configuration change to the operating environment, in the form of a code change, or in the form of a new or changed binary. An example of a configuration change may be a change to an operating system environment setting, or the closing of an unused network port. An example of a code change may be an amendment to a software script. An example of a binary change may be a replacement of a buggy dynamic link library, or the upgrade or addition of a new executable.

In block 704, the orchestration system 120 instantiates a mirror image 126 in cloud 124 via cloud infrastructure 236. As described above, the mirror image 126 provides a safe, non-production copy of the production environment for the enterprise information technology installation 102, to test the requested update prior to committing to a deployment to production. Accordingly, in block 706, the requested update is applied to the mirror image 126, where in block 708 one or more scripts 122 for security tests are applied to the mirror images.

The scripts 122 for security tests may encapsulate a request to run a third-party scanning tool, or alternatively may script internal scans and security checks. In one embodiment, the security tests as specified by the script 122 may be configured to the granularity of a single issue. Specifically, an issue may comprise a specific known single cybersecurity threat and the specific test or tests to detect that single cybersecurity threat. Single cybersecurity threats are often indexed and identified by a Common Vulnerability Exposure (CVE) identification number as provided by the Federal Government's National Institute of Standards and Technology (NIST). In this way, an applied test will have a one-to-one correspondence with a known issue, thereby enabling an administrator 114 to quickly identify the specific tests to detect specific cybersecurity threats. Instead of running a number of test suites, an administrator 114 can deliberately the correct subset of tests to execute upon receiving a notification of a specific cybersecurity threat.

In block 710, the executed security test scripts may identify one or more cybersecurity threats arising from the updates, or other threats that hitherto were not previously detected. In block 712, a policy engine 604, part of the remediation engine 314, may retrieve rules from a policy database identifying a remediation response for the identified cybersecurity threats. The policy database may be populated by responses provided by vendors, by other third parties, or identified by the administrator's organization. The remediation responses may be in the form of scripts that identify one or more specific configuration changes, code changes, or binary patches to apply, to neutralize the identified threats.

In other embodiments, the remediation response may be generated by a machine learning software 606, which identified other instances when similar cybersecurity threats were identified, and proposes the remediation responses used from those instances. In one embodiment, the machine learning software 606 may identify the remediation response from community database of applied fixes data store 608. The applied fixes data store 608 is described later in the application.

The remediation response may be stored in a persistent common file format, such as JSON to enable sharing with third parties in a standardized format.

In addition to generating a remediation response, in block 714, a rollback script, that is a script to undo changes made upon application of the remediation response is generated. Specifically, the remediation response is comprised of an ordered sequence of steps including configuration changes, code changes, and binary additions and updates. The rollback script is generated by making an ordered sequence of steps, of the opposite operation in the remediation response, in reverse order. For example, a configuration change and a code change can both be undone. Where the code change is compiled, the code change may be backed out and the binary recompiled and redeployed. Older versions of binaries may be restored. In the case of registered DLLs such as COM or .NET DLLs, the old versions of the binaries may be reregistered if necessary. Thus a rollback script may be the opposite operations of the remediation response script performed in reverse order.

In block 716, the remediation response is applied on top of the update to the mirror image 126. At this point, in block 718, the orchestration system 120 may be configured either to await administrator approval to deploy the update and remediation response (option A), or alternatively to automatically deploy the update and remediation response to production (option B). The administrator approval process is described with respect to FIG. 8. The automatic deployment option process with rollback, is described with respect to FIG. 9.

Turning to FIG. 8, in this option (option A), the orchestration system 120, is configured to await administrator approval. In block 802, the administrator 114, is notified via dashboard 302, that the system has identified cybersecurity threats from the requested update and that the update should not be applied without also applying the generated remediation response. A description of the cybersecurity threats may be provided as well as a description of the generated remediation response. In some embodiments, the cybersecurity threat identified is that of a single issue, such as identified by a CVE.

Upon receiving the notification, the administrator 114 will have time to review the generated fix and to review the cybersecurity threats. The administrator 114 in block 804 may then send either an approval or a rejection of the update and/or generated remediation response. If an approval is received, then the update and/or the generated remediation response is deployed to the production enterprise information technology installation 102.

In block 806, the choice of the administrator 114 whether to approve or reject the updated and/or generated remediation response is stored in a community applied fixes data store 608. The applied fixes data store 608 stores the update, the issue, the remediation response and whether the administrator 114 accepted or rejected the update and/or remediation response. Furthermore, the administrator 114 has the option of providing user generated content, such as comments, or an indication of the efficacy of the update and/or remediation response. Indications may include binary indications (e.g. like/not like), or a scalar indication (e.g. three out of five stars). Because the applied fixes data store 608 may store the administrator choice on a per issue basis, i.e. a per CVE basis, choices from other parties may be aggregated with that of the administrator and like decisions compared.

Turning to FIG. 9, in this option (option B), the update and the generated remediation response is in block 902 automatically deployed to the production enterprise information technology installation 102.

During deployment, an audit function tracks the date time stamp that each step of the remediation response is performed. The reporting tool 324 may act as an audit reporting tool to provide the administrator 114 of all operations performed on the production enterprise information technology installation 102.

Upon deployment, in block 904, the administrator 114 is notified of the change via dashboard. The update, the nature of the identified cybersecurity threats, and description of the generated and applied remediation response may be included in the notification.

There may arise an occasion that the administrator 114 wishes to undo the automatic deployment. In such an occasion, in block 906, the administrator 114 may send a notification via the dashboard 302 to perform a rollback. In block 908, the rollback is affected via applying the generated rollback script to the production enterprise information technology installation 102.

In block 910, the administrator 114 is notified via dashboard 302 that the rollback has been successfully applied. Note that the rollback script may perform a rollback on the configuration and the binaries, but the administrator 114 may back out changes to data as well. In some embodiments, this backing out may be automated by reviewing the audit logs. Specifically, the audit logs store the date time stamp that the updates and the remediation response was applied, and all operations since. The rollback script may review the audit logs, identify all data changes and state changes from the time of the date time stamp that the original update and remediation response was applied, and back those changes out.

As with the administrator approval option, in the automatic deployment option, the choice of the administrator to apply and to rollback the update and the generated remediation response is stored in applied fixes data store 608. Again, since the changes applied may be on a per issue basis, the choices of the administrator may be aggregated and compared with the choices of other third parties.

Community Applied Fixes

One of the features of the orchestration system 120 is that the behavior of the administrator 114 is stored in an applied fixes data store 608 and aggregated with the behavior of other administrators from a wide variety of other enterprises. In this way, a statistically significant number of decisions regarding updates and generated remediation responses may be subjected to aggregation and machine learning analysis.

One attribute of the applied fixes data store 608 is that updates and remediation responses identified are specific to an issue. In this way, like updates and responses may be compared to other like updates and responses. Another attribute of the applied fixes data store 608 is that user generated content may be applied both by the administrator 114 who made the decision, but also by commenting third parties. This user generated content may be used by the machine learning software 606 to statistically weigh administrator decisions.

Since the applied fixes data store 608 may be accessed by a community, there is the risk that malicious actors may attempt to pollute the data in the applied fixes data store 608 with misinformation, in an effort to reduce the quality of the information in the applied fixes data store 608. User generated content may be limited to posts where the posting party provides an identity. Furthermore, the machine learning software 606 may aggregate posts by an individual identity and seek a pattern of incorrect user generated content, and mark the individual identity as a malicious actor. At this point, the machine learning software 606 may be configured to give minimal or no weight to feedback provided by those individual identities. Alternatively, posts by the marked individual identity may be deleted and subsequent posts blocked. In this way, the machine learning software 606 may not only identify updates and generated responses from the community as posted to the applied fixes data store 608 but may police the community itself.

Monitoring & Reporting Enterprise Level Cyber Security Remediation

Figure 10:
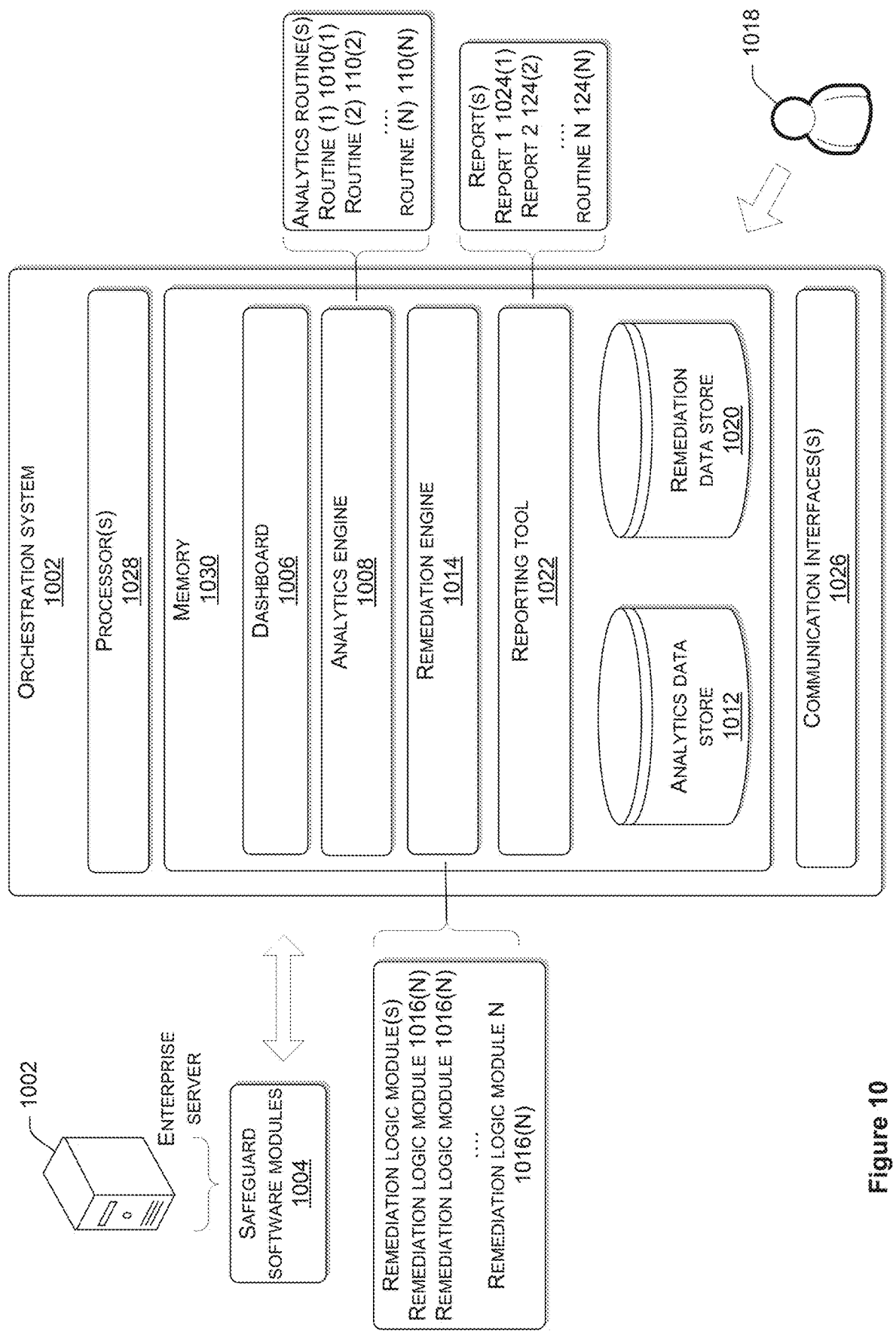
FIG. 10 illustrates an exemplary orchestration system that interfaces with server-side software modules.

FIG. 10 illustrates an exemplary orchestration system 1002 that interfaces with server-side software modules 1004. The orchestration system 1002 that can orchestrate deployment of one or more safeguarding systems that provide an enterprise infrastructure with enterprise level security. In one example, the orchestration system may perform passive and active scanning, end-to-end threat penetration testing, and application recovery.

Enterprise level security orchestration enables security testing and safeguarding functions that support a security scenario. Scenarios include, without limitation, vulnerability scanning, active scanning, penetration test scanning, web application scanning, end-to-end-scanning, software development scanning, pre-release scanning, white hat/tiger team methodology scanning, remediation management, and reporting management.

The server-side software modules 1004 may correspond to a safeguard software package that is deployed by an administrator to perform a safeguarding or security function. The administrator is typically an operator of the orchestration system 1002 who oversees implementation of the orchestration system 1002.

The orchestration system 1002 may include communication interfaces 1026, such as input/output interface(s) and network interface(s). The input/output interface(s) may include any type of output interface known in the art, such as a display (e.g. a liquid crystal display), speakers, a vibrating mechanism, or a tactile feedback mechanism. Input/output interface(s) also include ports for one or more peripheral devices, such as headphones, peripheral speakers, or a peripheral display. Further, the input/output interface(s) may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the communication interfaces 1026 may also include network interface(s). The network interface(s) may include any sort of transceiver known in the art. For example, the network interface(s) may include a radio transceiver that performs the function of transmitting and receiving radio frequency communications via an antenna. In addition, the network interface(s) may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) may include wired communication components, such as an Ethernet port or a Universal Serial Bus (USB).

Further, the orchestration system 1002 may include one or more processor(s) 1028 that are operably connected to memory 1030. In at least one example, the one or more processor(s) 1028 may be a central processing unit(s) (CPU), graphics processing unit(s) (GPU), or both a CPU and GPU or any other sort of processing unit(s). Each of the one or more processor(s) 1028 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 1028 may also be responsible for executing all computer applications stored in the memory, which can be associated with common types of volatile (RAM) and/or non-volatile (ROM) memory.

In some examples, memory 1030 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 1030 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 1030 may include a dashboard 1006, an analytics engine 1008, a remediation engine 1014, a reporting tool 1022, an analytics data store 1012, and a remediation data store 1020.

In the illustrated example, the dashboard 1006 may provide an integrated view of the security status of the enterprise infrastructure. In one example, the dashboard 1006 may show a status, progress, of current and historical reports, recommendations, and alerts.

Moreover, the analytics engine 1008 may run analytics routine(s) 1010(1)-1010(N) to identify threats. When a threat is detected, the analytics engine 1008 may create a record and populate an analytics data store 1012. Further, a remediation engine 1014 may monitor the analytics data store 1012 and detect threat patterns. The detection may be through any number of remediation logic module(s) 1016(1)-1016(N). In one example, a remediation logic module may be hardcoded script from an administrator 1018. In another example, the remediation logic module(s) 1016(1)-1016(N) may implement any number of known machine learning algorithms to identify threats or threat patterns, and suggest corresponding remediation responses. Remediation responses that are repeatedly accepted or used by an administrator are stored in a remediation data store 1020.

Moreover, the reporting tool 1022 may create report(s) 1024(1)-1024(N) based on records of the analytics data store 1012. The orchestration system 1002 may further surface the availability of those reports on the dashboard 1006. In some cases, the reporting tool 1022 may be invoked by the remediation engine 1014 to surface recommended responses as recommendations.

Figure 11:
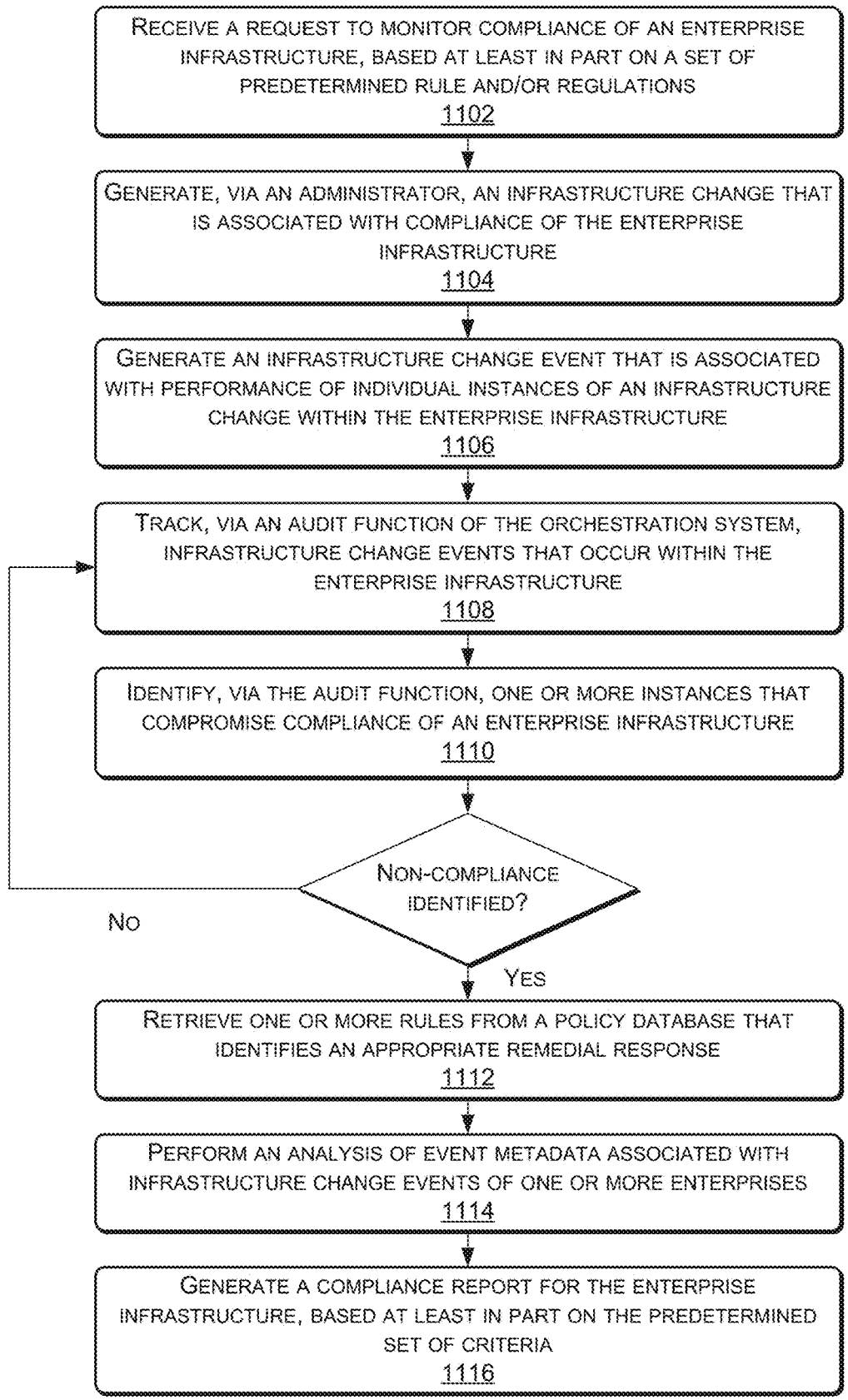
FIG. 11 illustrates a block diagram of an orchestration system process that monitors compliance of an enterprise infrastructure based at least in part on predetermined criteria.

FIG. 11 illustrates a block diagram of an orchestration system process that monitors compliance of an enterprise infrastructure based at least in part on predetermined criteria.

At 1102, the orchestration system may receive a request to monitor compliance of an enterprise infrastructure. The request may further include a set of predetermined criteria and/or regulations. In one example, the orchestration system may receive the request from an organization auditing its own compliance. Alternatively, or additionally, the orchestration system may receive the request from a third party, government or non-government agency, that is tasked with monitoring enterprise-level compliance.

In a non-limiting example, the orchestration system may receive the request from a government agency wanting to monitor compliance with a set of regulations derived from an Act of legislations, such as the Sarbanes Oxley Act. In this example, the Sarbanes Oxley Act mandates adequate enterprise-level controls to safeguard financial data. In another example, the orchestration system may receive the request from a non-governmental insurance carrier wanting to monitor compliance of enterprise-level cyber security systems for providing enterprise-level insurance against data breach and/or data loss events.

In some examples, the request may include a set of predetermined criteria upon which the orchestration system is to monitor the enterprise infrastructure. For example, the set of predetermined criteria may relate to verifying performance of preemptive or remedial cyber-security actions that shown compliance with regulations to safeguard financial data (i.e. governmental agency compliance criteria—Sarbanes Oxley Act), or protecting data stored or communicated via the enterprise infrastructure from known cybersecurity threats (i.e. non-government insurance carrier compliance criteria).

At 1104, the administrator of the orchestration system may generate an infrastructure change that is associated with compliance with the set of predetermined criteria. The infrastructure change may correspond to executing a preemptive action (i.e. monitoring) or a remedial response. In one example, the infrastructure change may correspond to one or more scripts that automate verification of compliance with the set of predetermined criteria. Further, the administrator may assign an identification number, such as a Common Vulnerability Exposure (CVE) identification number, to each infrastructure change.

In some examples, the infrastructure change may include scripts that execute third-party scanning tools that verifies performance of a preemptive or remedial action within the enterprise infrastructure. Alternatively, or additionally, the scripts may be internal scans, within the enterprise infrastructure, that identify instances of compliance with the predetermined criteria.

At 1106, the orchestration system may generate an infrastructure change event that is associated with performance of individual instances of an infrastructure change within the enterprise infrastructure. Further, the orchestration system may assign each individual infrastructure change event with an identification number that associates each infrastructure change event with a corresponding infrastructure change.

At 1108, the orchestration system, via an audit function, may track infrastructure change events that occur within the enterprise infrastructure. The audit function may generate event metadata associated with each infrastructure change event, such as but not limited to, a date and time stamp, a description of each preemptive or remedial action performed, along with a success/failure status of each step. Further, the audit function may store the event metadata for each infrastructure change event within a decentralized secure ledger service that uses block chain technology. In some examples, the audit function may facilitate user input of event metadata associated with each infrastructure change event. In one example, the user input may correspond to a user rating associated with the infrastructure change event. The user rating may correspond to a significance or importance of the infrastructure change event relative to the enterprise infrastructure. In some examples, the user rating may be based on an alpha-numeric scale (i.e. 0 to 10, or A to F), a descriptive expression (i.e. low, medium, or high), based on color (i.e. red, yellow, or green), or any other suitable scale that reflects a significance or importance of an infrastructure change event. In another example, the user input may correspond to an annotation associated with the infrastructure change event. The annotation may correspond to a description of a particular error, malicious attack, false positive, and/or so forth.

At 1110, the orchestration system, via the audit function, may identify one or more instances that compromise a compliance of the enterprise infrastructure, based at least in part on the set of predetermined criteria. In a non-limiting example, the orchestration system may identify one or more instances of financial data that may have been compromised by a known, single cybersecurity threat, based on a determination that a preemptive or remedial action had not been performed to safeguard the financial data. In this example, audit function may further determine that a non-compliance of preemptive or remedial actions that safeguard financial data may be in further breach of third-party rules and/or regulations, such that those imposed by the Sarbanes Oxley Act, which regulate measures to safeguard financial data.

In another non-limiting example, the audit function may identify instances of non-compliance with third-party criteria set by an insurance carrier that insures enterprise data from data loss and/or data breach. In this example, the audit function may monitor performance of preemptive or remedial actions within the enterprise infrastructure that are mandated by the third-party criteria.

At 1112, the orchestration system, may determine that non-compliance of a predetermined criteria has occurred. In doing so, the orchestration system may retrieve one or more rules from a policy database that identifies an appropriate remedial response. The policy database may be populated by responses provided the government entity associated with the request to monitor compliance of the enterprise infrastructure. Alternatively, the policy database may be populated by responses provided by other third parties, or identified the administrator of the enterprise infrastructure.

Further, the remedial response may be in the form of a script that implements one or more specific configuration changes, code changes, or binary patches that are intended to mitigate the security threat associated with the financial data.

At 1114, the orchestration system, via a reporting tool, may perform an analysis of event metadata associated with infrastructure change events of one or more enterprises. In some examples, infrastructure change events of one or more enterprises may be maintained, via the orchestration system, in a single decentralized secure ledger. In other examples, infrastructure change events for each individual enterprise may be maintained, via the orchestration system, in stand-alone decentralized secure ledgers (i.e. private block chain).

Moreover, the analysis of event metadata for infrastructure change events may identify an effectiveness of various remedial measures relative to specific errors, or malicious attacks. The reporting tool may use various trained machine learning models to recommend particular remedial measures to resolve specific errors or malicious attacks.

At 1116, the orchestration system, via the reporting tool, may generate a verification report for the enterprise infrastructure, based at least in part on the predetermined set of criteria. In one example, the verification report may identify individual instances of compliance with the predetermined set of criteria, identify instances of non-compliance, identify instances of remedial responses performed to mitigate a non-compliance, or any combination thereof. The verification report may include charts, graph figures, models, schematics maps, summaries, reports, logs, and/or so forth. Further, the verification report may also include a analysis to predict future threats to enterprise infrastructure and/or failure of enterprise infrastructure components.

Figure 12:
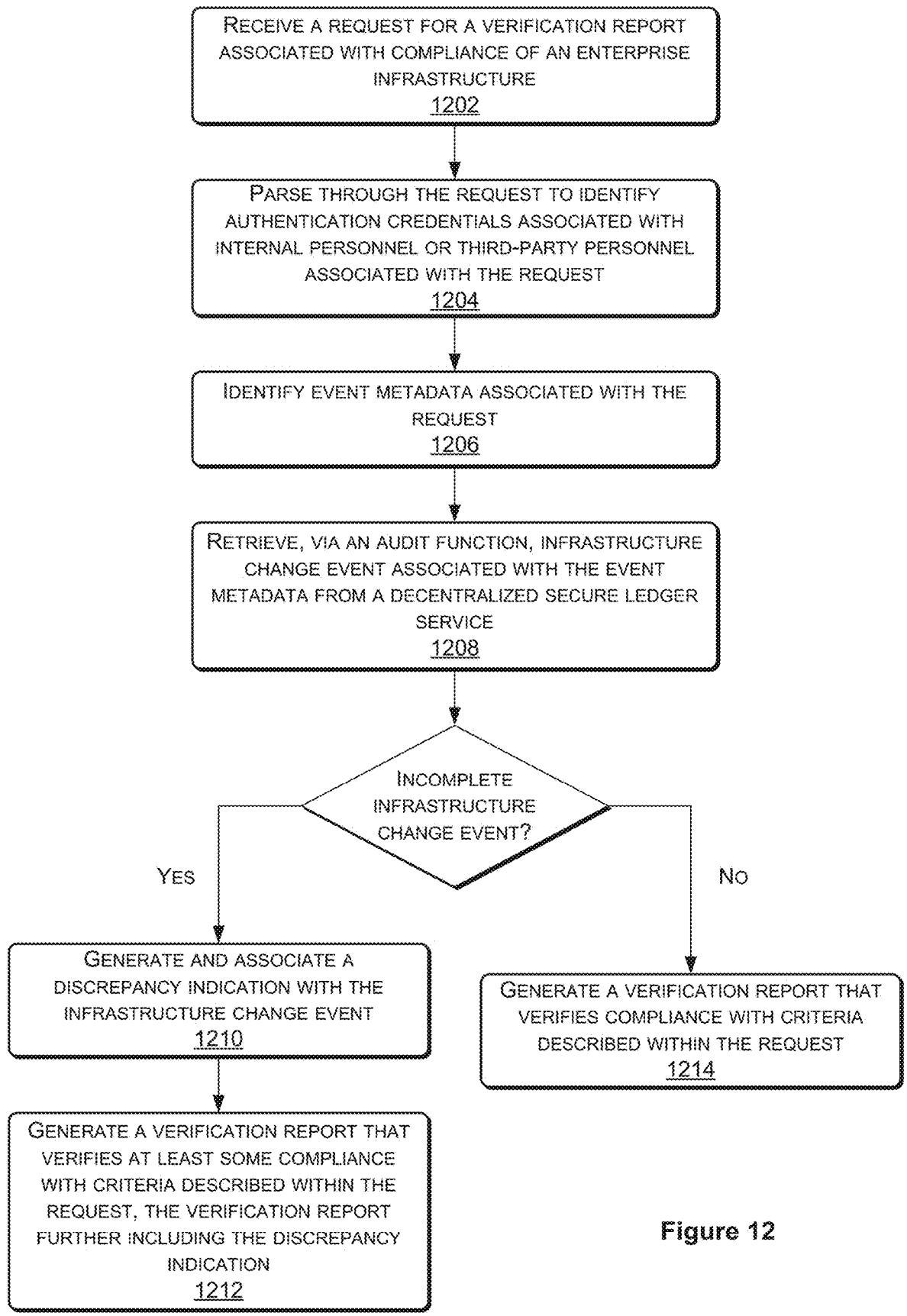
FIG. 12 illustrates a block diagram of an orchestration system process that generates a verification report for distribution to a third party, based at least in part on verifying authentication credentials associated with the third party.

FIG. 12 illustrates a block diagram of an orchestration system process that generates a verification report for distribution to a third party, based at least in part on verifying authentication credentials associated with the third party.

At 1202, the orchestration system, via a reporting tool, may receive a request for a verification report from internal personnel associated with the enterprise infrastructure, or third-party personnel associated with the enterprise infrastructure. In one non-limiting example, internal personnel may request a verification report to verify compliance of the enterprise infrastructure relative to a set of predetermined criteria, such as internal governance rules. For example, the request may include a query for validation of an infrastructure change implemented within the enterprise infrastructure. The infrastructure change may correspond to a configuration change of underlying hardware or software architecture, a change to code executed on one or more computing devices operating within the enterprise infrastructure, or application of a patch to software within the enterprise infrastructure. Additionally, the infrastructure change may correspond to initiation of a proposed infrastructure change, rollback of a previously performance infrastructure change event, or rollback of a change to underlying software or hardware architecture, or any combination thereof.

Further, third-party personnel, such as an insurance carrier, may request a verification report to ensure that the enterprise has complied with predetermined requirements for mitigating instances of data breach or data loss. For example, the insurance carrier may set preconditions upon which an enterprise may be insured against data breach and data loss. The preconditions may correspond to performance of particular pre-emptive and/or remedial actions within the enterprise infrastructure. In other words, the insurance carrier may revoke or modify an insurance policy, or deny an insurance claim in response to determining that the enterprise infrastructure has not complied with the set of preconditions (i.e. predetermined criteria). In some examples, an insurance carrier may request a verification report that audits implementation of a preemptive or remedial action that is associated with a Common Vulnerability Exposure (CVE) identification number. In this example, the request for the verification report may include the CVE identification number, along with authentication credentials of the insurance carrier.

In yet another non-limiting example, third-party personnel may include a government agency or government actor that is tasked with verifying compliance of government regulations, such as but not limited to, the Sarbanes Oxley Act. In this example, the verification report may be requested to verify compliance with controls mandated by regulation to safeguard financial data from cyber security threats and breach.

At 1204, the orchestration system may parse through the request to identify authentication credentials for internal personnel or third-party personnel associated with the request. In some examples, the authentication credentials may be authenticated by a decentralized secure ledger service. In various embodiments, an authentication credential may be authenticated as valid if the authentication credential belongs to a user that is pre-registered with the decentralized secure ledger service as an authorized user. In some instances, the user authentication credential may be a user identifier. In other instances, the user authentication credential may be a combination of a user identifier and a secret, such as a password, a digital certificate, biometric information, and/or so forth. Further, the decentralized secure ledger service may further associate a set of verification data that are accessible to a user, based on the authentication credential. For example, an insurance carrier may be authorized to access verification data that relates to pre-conditions (i.e. predetermined set of criteria) set by the insurance carrier, however may not access verification data that is associated with a government agency or government actor that is intended to verify compliance with separate, government regulations.

At 1206, the orchestration system may identify event metadata associated with the request. In a non-limiting example, the event metadata may include, a CVE identification number, a software patch identifier, an attack vector identifier, a specific response identifier that corresponds to an attack vector, a test identifier that corresponds to a test suite execution event, an administration decision event that record whether an administrator decided to deploy an infrastructure change, or any other identifier that is associated with an infrastructure change, and/or infrastructure change event.

At 1208, the orchestration system, via an audit function, may retrieve infrastructure change events associated with the event metadata from a decentralized secure ledger service. In some examples, the event metadata may be encrypted via an encryption key that is supplied by a decentralized secure ledger server. The encryption key may be provided for use by authorized users (i.e. internal personnel or third-party personnel with verified authentication credentials) within the enterprise infrastructure. In one example, the encryption key may be downloaded from a decentralized secure ledger service and accessed via the audit function at an electronic storage media of the enterprise.

In one example, the encryption key may be a public key of a public-private asymmetric cryptographic key pair, in which the private key is held by the decentralized secure ledger service. Accordingly, the audit function may encrypt the event metadata using the private key, such that the event metadata may be decrypted by the decentralized secure ledger service using the private key pairing.

At 1210, the orchestration system, via an audit function, may determine that the infrastructure change associated with each infrastructure change event is incomplete. In doing so, the audit function may generate and associate a discrepancy indication with the infrastructure change event. The discrepancy indication may be intended to show that the infrastructure change is incomplete, possibly due to a system malfunction or human error.

At 1212, the audit function may generate a verification report that is delivered via email or a reporting dashboard of a client device that is associated with the registered user of the request. The verification report that includes an indication of compliance and non-compliance of the enterprise infrastructure with the set of predetermined criteria. The verification report may further include the discrepancy indications associated with infrastructure change events that indicate an incomplete infrastructure change. In some examples, the content of the verification report may be redacted based on access privileges associated with the authentication credentials.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A computer-implemented method, comprising:
  receiving a request to monitor compliance of an enterprise infrastructure;
  generating an infrastructure change that is associated with the compliance of the enterprise infrastructure, based at least in part on a set of predetermined criteria;
  generating one or more infrastructure change events based at least in part on instances of the infrastructure change within the enterprise infrastructure;
  generating a first set of event metadata that includes a description of actions attempted for the one or more infrastructure change events and data indicating whether the actions where successfully performed;

identifying at least one infrastructure change event of the one or more infrastructure change events that corresponds to a non-compliance of the enterprise infrastructure, based at least in part on the set of predetermined criteria;

retrieving, from a policy database, a remedial response associated with the non-compliance of the enterprise infrastructure;

in response to executing the remedial response, analyzing a second set of event metadata associated with the at least one infrastructure change event to determine an effectiveness of the remedial response relative to specific errors or attacks; and based on the first set of event metadata that includes the description of the actions attempted for the one or more infrastructure change events and data indicating whether the actions where successfully performed and based on the second set of metadata associated with the at least one infrastructure change event to determine the effectiveness of the remedial response relative to the specific errors or attacks, generating a verification report for the enterprise infrastructure.

2. The computer-implemented method of claim 1, wherein the enterprise infrastructure corresponds to one of an organization conducting a compliance audit, a third-party agency monitoring enterprise-level compliance, or a government agency monitoring enterprise-level compliance with a set of regulations.

3. The computer-implemented method of claim 1, wherein the enterprise infrastructure is associated with a third-party agency tasked with monitoring compliance of an enterprise-level cyber security system, and
    wherein the request further includes a set of predetermined criteria, the set of predetermined criteria including at least one predetermined criteria to verify performance of a preemptive or remedial cybersecurity action that indicates compliance of the enterprise-level cyber security system.

4. The computer-implemented method of claim 1, wherein the infrastructure change corresponds to execution of scanning tools to verify performance of a preemptive action or a remedial action associated with the compliance of the enterprise infrastructure.

5. The computer-implemented method of claim 1, further comprising:
    assigning the infrastructure change event with an identification number that is associated with the infrastructure change; and
    tracking the infrastructure change event is based at least in part on the identification number.

6. The computer-implemented method of claim 1, wherein the first set of event metadata and the second set of event metadata includes one or more of a date stamp, a time stamp, a first description of the actions that were preemptive actions, a second description of the actions that were remedial actions, and a corresponding success or failure status associated with the first description and the second description.

7. The computer-implemented method of claim 1, wherein at least one of the first set of event metadata and the second set of event metadata is stored within a decentralized secure ledger service that uses blockchain technology.

8. The computer-implemented method of claim 1, wherein at least one of the first set of event metadata or the second set of event metadata further includes at least one of a user rating or a user annotation that is associated with the infrastructure change event.

9. The computer-implemented method of claim 1, wherein the remedial response corresponds to a script that implements at least one of a configuration change, a code change, or a binary patch that mitigates a non-compliance of the enterprise infrastructure.

10. The computer-implemented method of claim 1, wherein the verification report identify a first set of individual instances of compliance within the enterprise infrastructure, a second set of individual instances of the non-compliance within the enterprise infrastructure, or a third set of individual instances of remedial responses performed within the enterprise infrastructure to mitigate the non-compliance.

11. One or more non-transitory computer-readable media storing computer-executable instructions that, when executed on one or more processors, cause the one or more processors to perform acts comprising:
    receiving, from a registered user, a request to monitor compliance of an enterprise infrastructure;
    generating an infrastructure change that is associated with the compliance of the enterprise infrastructure, based at least in part on a set of predetermined criteria;
    generating one or more infrastructure change events based at least in part on instances of the infrastructure change within the enterprise infrastructure;
    generating event metadata that includes (i) a description of actions attempted for the one or more infrastructure change events, (ii) data indicating whether the actions where successfully performed, and (iii) data indicating an effectiveness of the actions relative to specific errors or attacks;
    generating a verification report for the enterprise infrastructure, based at least in part on the one or more infrastructure change events and on the event metadata that includes (i) the description of the actions attempted for the one or more infrastructure change events, (ii) the data indicating whether the actions where successfully performed, and (iii) the data indicating the effectiveness of the actions relative to the specific errors or attacks; and
    transmitting the verification report to a registered user associated with the request.

12. The one or more non-transitory computer-readable media of claim 11, further storing instructions that, when executed cause the one or more processors to perform acts comprising:
    parsing through the request to identify authentication credentials associated with the registered user; and
    in response verifying the authentication credentials, identifying a set of verification data associated with the request, and
    wherein, generating the verification report is based at least in part on the set of verification data.

13. The one or more non-transitory computer-readable media of claim 11, further storing instructions that, when executed cause the one or more processors to perform acts comprising:
    identifying at least one infrastructure change event of the one or more infrastructure change events that corresponds to a non-compliance of the enterprise infrastructure, based at least in part on the set of predetermined criteria;

retrieving, from a policy database, a remedial response associated with the non-compliance of the enterprise infrastructure; and in response to executing the remedial response, analyzing the event metadata to determine an effectiveness of the remedial response, and wherein generating the verification report is based at least in part on analysis of the event metadata.

14. The one or more non-transitory computer-readable media of claim 11, wherein the event metadata includes one or more of a date stamp, a time stamp, a first description of the actions that were preemptive actions, a second description of the actions that were remedial actions, and a corresponding success or failure status associated with the first description and the second description.

15. The one or more non-transitory computer-readable media of claim 11, further storing instructions that, when executed cause the one or more processors to perform acts comprising:

parsing through the request to identify authentication credentials associated with the registered user;

determining access privileges associated with the registered user, based at least in part on the authentication credentials, and wherein the verification report includes content that is redacted based in part on access privileges associated with the registered user.

16. A system comprising:

one or more processors; and memory coupled to the one or more processors, the memory including one or ore modules that are executable by the one or more processors to:

receive, from a registered user, a request for a verification report that is associated with an enterprise infrastructure, the verification report to verify a compliance of the enterprise infrastructure with a set of predetermined criteria;

parse through the request to identify authentication credentials associated with the registered user;

in response verifying the authentication credentials, identify a set of verification data associated with the request;

identify event metadata associated with the request;

retrieve infrastructure change events associated with the event metadata from a decentralized secure ledger service, the infrastructure change events indicating a compliance or a non-compliance with the set of predetermined criteria and the event metadata indicating (i) a description of actions attempted for the infrastructure change events, (ii) data indicating whether the actions where successfully performed, and (iii) data indicating an effectiveness of the actions relative to specific errors or attacks; and generate a verification report for delivery to the registered user associated with the request, the verification report to include an indication of compliance or non-compliance of the enterprise infrastructure, based at least in part on the set of predetermined criteria and on the event metadata that includes (i) the description of the actions attempted for the infrastructure change events, (ii) the data indicating whether the actions where successfully performed, and (iii) the data indicating the effectiveness of the actions relative to the specific errors or attacks.

17. The system of claim 16, wherein the event metadata includes at least one of a Common Vulnerability Exposure (CVE) identification number, a software patch identifier, an attack vector identifier, a response identifier that corresponds to an attack vector, a test identifier that corresponds to a test suite execution event, an administration decision event associated with deployment of an infrastructure change, or an identifier associated with an infrastructure change event.

18. The system of claim 16, wherein the one or more modules are further executable by the one or more processors to:

determine that an infrastructure change associated with instances of the infrastructure change events is incomplete;

generate a discrepancy indication associated with the infrastructure change that is incomplete; and associate the discrepancy indication with the instances of the infrastructure change events, and wherein, the verification report further includes the discrepancy indication.

19. The system of claim 16, wherein the one or more modules are further executable by the one or more processors to:

determine access privileges associated with the registered user, based at least in part on the authentication credentials, and, wherein the verification report includes content that is redacted based in part on access privileges associated with the registered user.

20. The system of claim 16, wherein the verification report is delivered to the registered user via email or a reporting dashboard of a client device associated with the registered user.

* * * * *